(12) United States Patent
Erler

(10) Patent No.: US 12,024,096 B2
(45) Date of Patent: Jul. 2, 2024

(54) COMPONENT FOR VEHICLE INTERIOR

(71) Applicant: Shanghai Yanfeng Jinqiao Automotive Trim Systems Co. Ltd., Novi, MI (US)

(72) Inventor: Ivo Erler, Düsseldorf (DE)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 0 days.

(21) Appl. No.: 18/111,528

(22) Filed: Feb. 17, 2023

(65) Prior Publication Data

US 2023/0192010 A1    Jun. 22, 2023

Related U.S. Application Data

(63) Continuation of application No. PCT/US2021/049070, filed on Sep. 3, 2021.

(60) Provisional application No. 63/074,647, filed on Sep. 4, 2020.

(51) Int. Cl.
   *B60R 13/02*      (2006.01)
   *B41J 3/407*      (2006.01)

(52) U.S. Cl.
   CPC .............. *B60R 13/02* (2013.01); *B41J 3/4073* (2013.01)

(58) Field of Classification Search
   CPC ............................... B60R 13/02; B41J 3/4073
   USPC .......................................................... 428/201
   See application file for complete search history.

(56) References Cited

U.S. PATENT DOCUMENTS

| | | | |
|---|---|---|---|
| 6,360,656 B2 | 3/2002 | Kubo et al. | |
| 7,194,341 B2 | 3/2007 | Altenkirch | |
| 7,357,959 B2 | 4/2008 | Bauer | |
| 8,722,139 B2 | 5/2014 | Heys et al. | |
| 10,494,533 B2 | 12/2019 | De Rossi et al. | |

(Continued)

FOREIGN PATENT DOCUMENTS

| | | |
|---|---|---|
| DE | 10 2013 019 272 A1 | 12/2014 |
| DE | 10 2015 205 631 A1 | 6/2015 |

(Continued)

OTHER PUBLICATIONS

International Search Report and Written Opinion received for International PCT Application Serial No. PCT/US21/49070 dated Dec. 23, 2021, 17 pages.

*Primary Examiner* — Betelhem Shewareged

(74) *Attorney, Agent, or Firm* — Amin, Turocy & Watson, LLP

(57) ABSTRACT

A component for a vehicle interior may be illuminated and may comprise a cover formed on a substrate. The substrate and/or cover may be at least partially light-transmissive. The cover may present a visual and/or surface effect on its exterior surface. The visual effect may comprise an illumination effect when illuminated. The cover may comprise a base layer formed on a cover layer. The cover may comprise a coating formed on the cover layer. The cover may present a texture visible through the coating. The cover may comprise a set of light-transmissive sections to provide illumination. The light-transmissive sections may comprise voids, holes or openings in the cover. The cover may comprise a deposited material formed on the substrate. The deposited material may comprise resin. The deposited material may comprise a form on the substrate. A method of forming the component is also disclosed.

20 Claims, 24 Drawing Sheets

(56) References Cited

U.S. PATENT DOCUMENTS

| | | |
|---|---|---|
| 10,500,875 B2 | 12/2019 | Bouwens et al. |
| 10,664,073 B2 | 5/2020 | Bauer |
| 10,953,667 B2 | 3/2021 | Bauer |
| 2004/0168755 A1 | 9/2004 | Parker |
| 2009/0169719 A1 | 7/2009 | Orr |
| 2010/0221504 A1 | 9/2010 | Bauer |
| 2017/0312958 A1 | 11/2017 | Wegner et al. |
| 2018/0022123 A1 | 1/2018 | Del-Aguila et al. |
| 2019/0135199 A1* | 5/2019 | Galan Garcia ........ B60K 35/00 |
| 2019/0283690 A1 | 9/2019 | Hansen et al. |
| 2023/0192010 A1* | 6/2023 | Erler ..................... B32B 7/023 |
| | | 428/201 |

FOREIGN PATENT DOCUMENTS

| | | |
|---|---|---|
| DE | 10 2010 047 924 B4 | 5/2017 |
| DE | 10 2010 032 838 B4 | 12/2017 |
| DE | 10 2010 032 839 B4 | 3/2019 |
| EP | 2 208 542 A1 | 7/2010 |
| EP | 2 189 272 B1 | 12/2016 |
| EP | 3 578 366 A1 | 12/2019 |
| EP | 3613573 A1 | 2/2020 |
| EP | 3 064 281 B1 | 1/2023 |
| FR | 3 087 729 B1 | 12/2020 |
| FR | 3 087 704 B1 | 4/2021 |
| WO | 2019/165441 A1 | 8/2019 |
| WO | WO-2019165441 A1 * | 8/2019 ............. B32B 21/02 |

\* cited by examiner

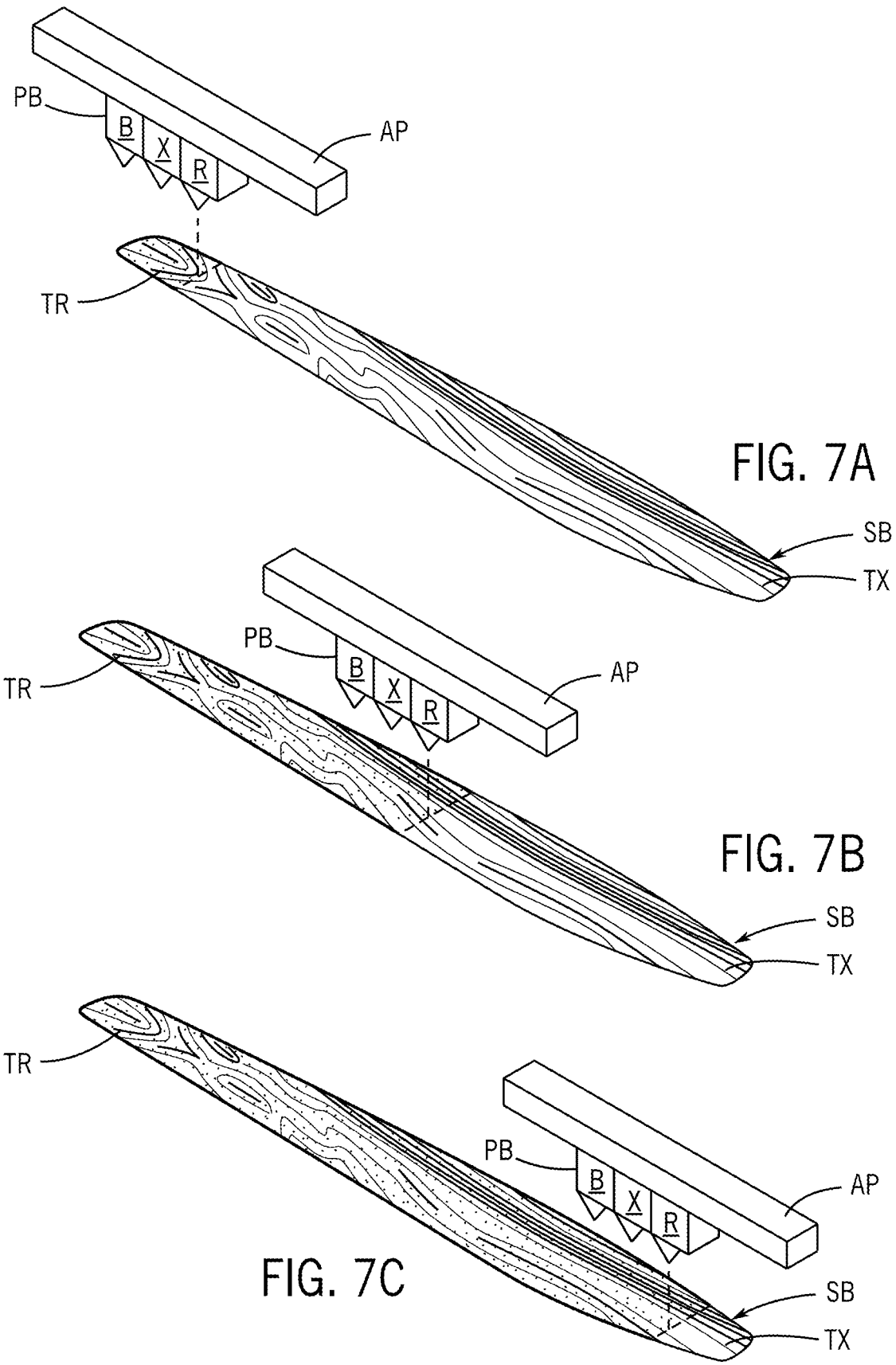

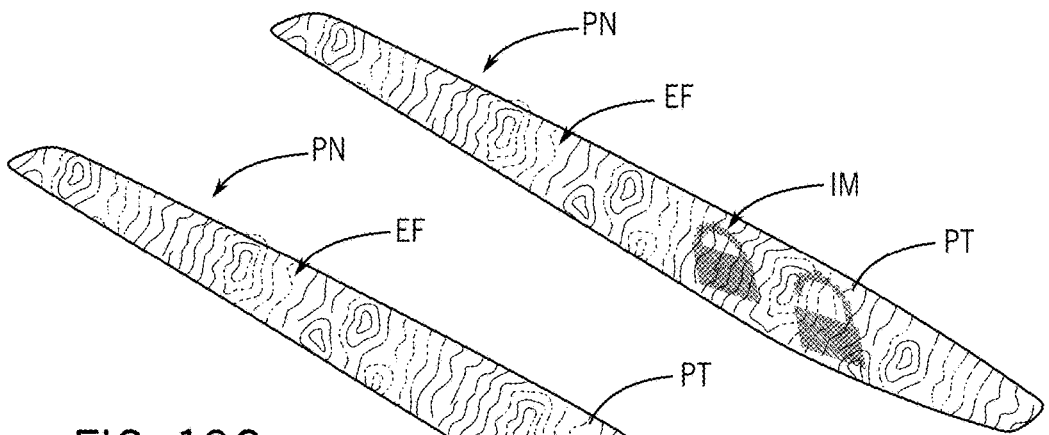
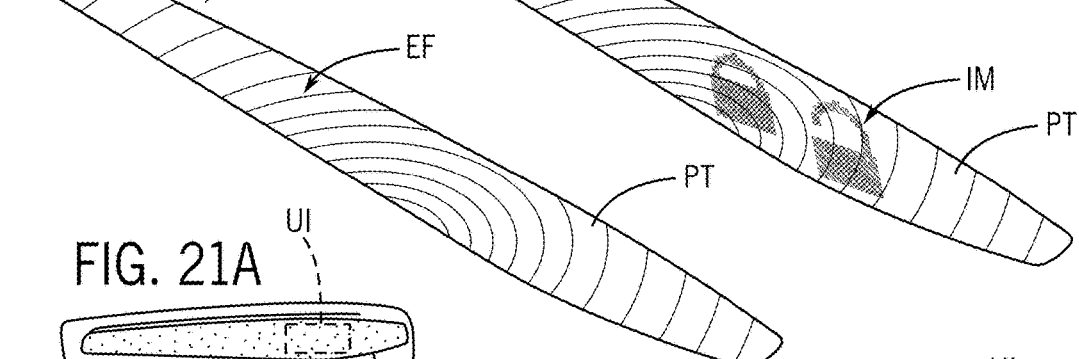
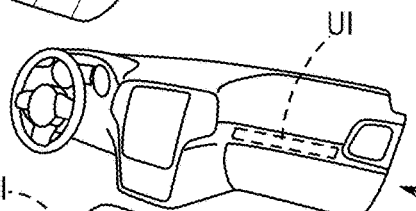
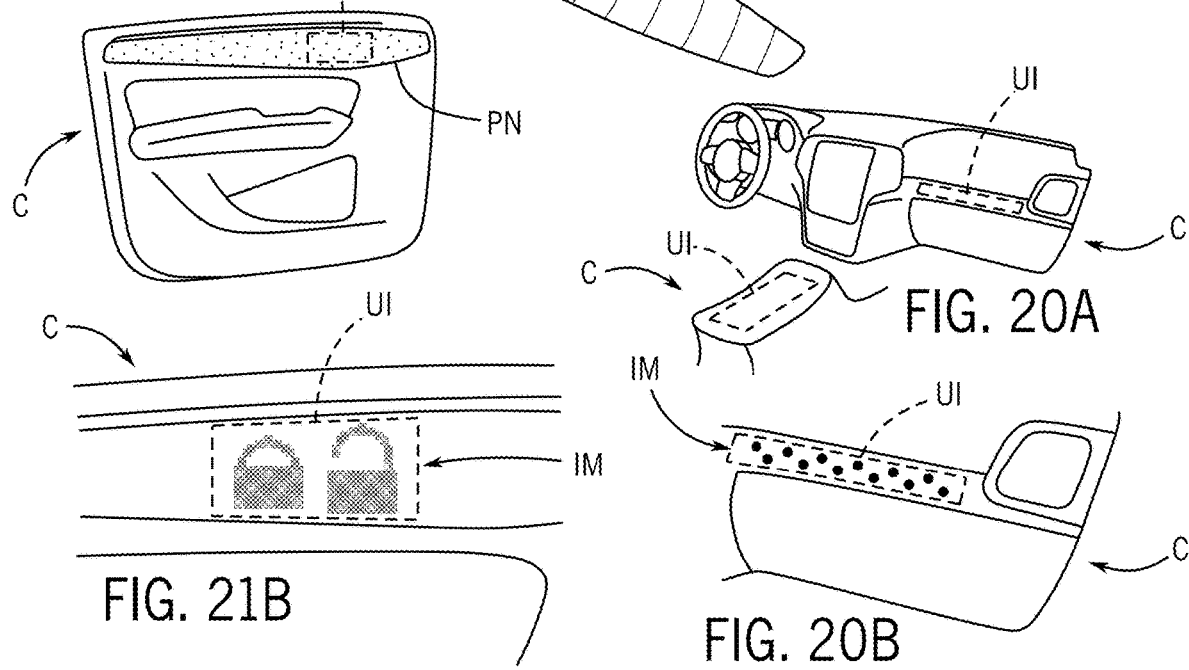

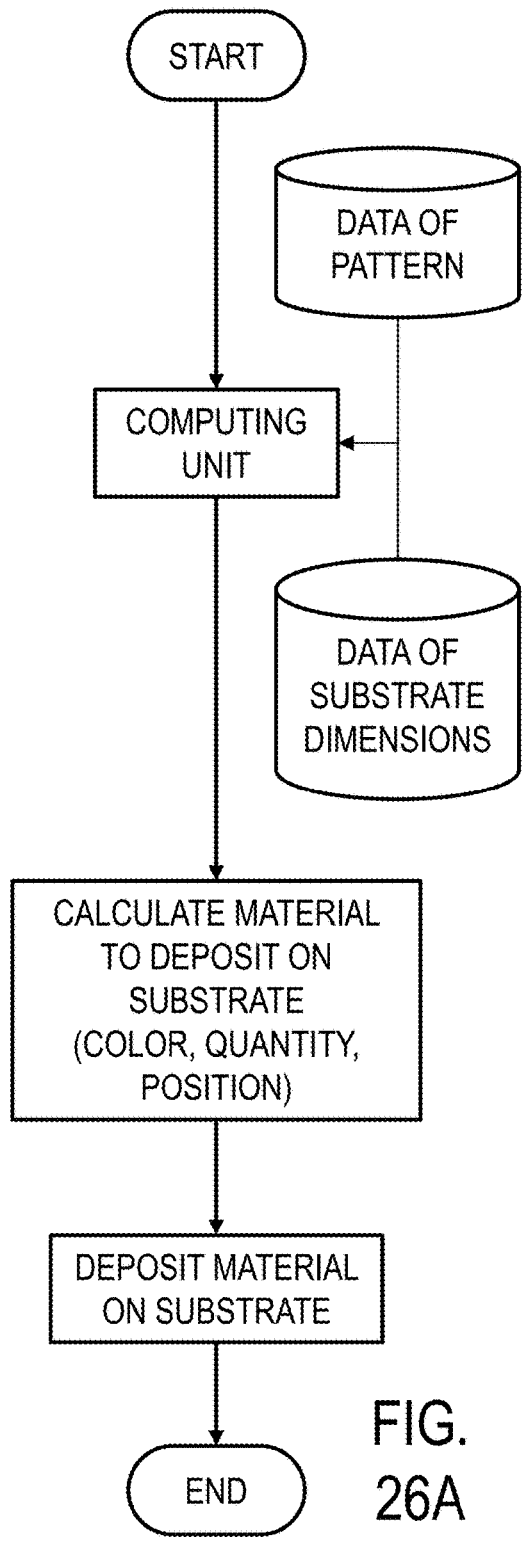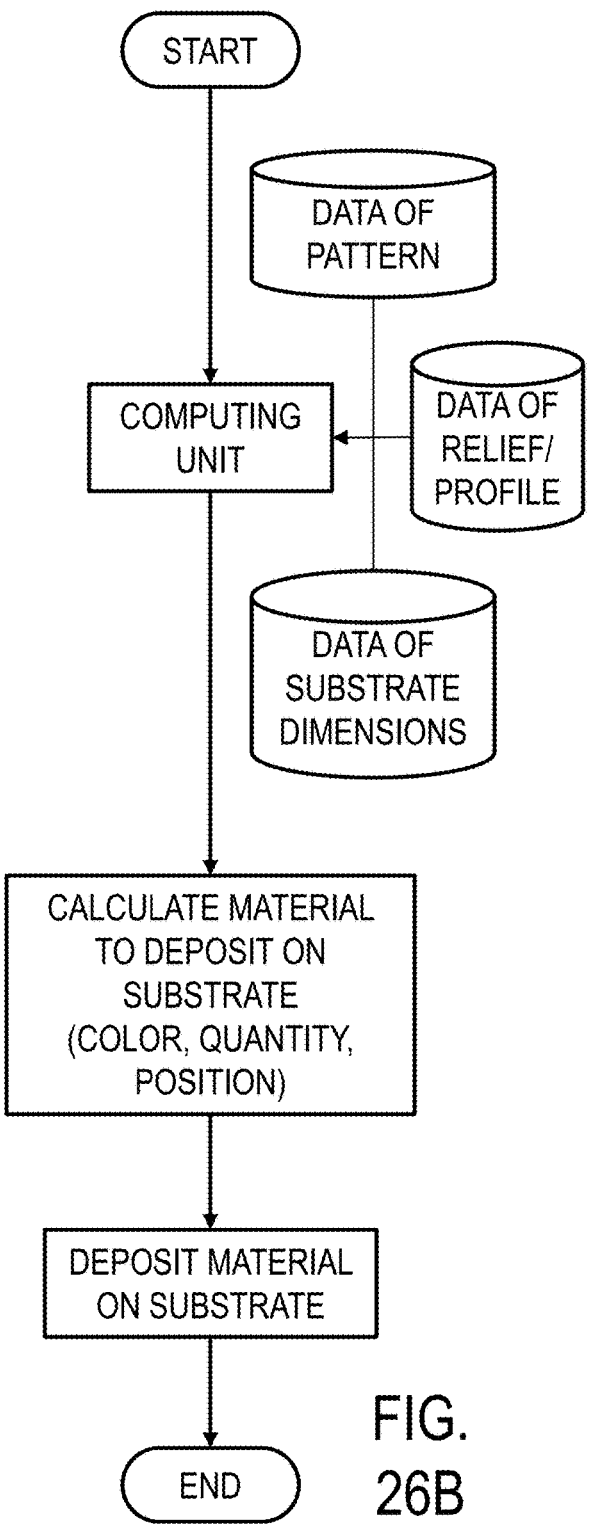

COMPONENT FOR VEHICLE INTERIOR

CROSS-REFERENCE TO RELATED APPLICATIONS

The present application is a continuation of PCT/International Patent Application No. PCT/US2021/049070 titled "VEHICLE INTERIOR COMPONENT" filed Sep. 3, 2021, which claims the benefit of U.S. Provisional Patent Application No. 63/074,647 titled "VEHICLE INTERIOR COMPONENT" filed Sep. 4, 2020.

The present application claims priority to and incorporates by reference in full the following patent application: (a) PCT/International Patent Application No. PCT/US2021/049070 titled "VEHICLE INTERIOR COMPONENT" filed Sep. 3, 2021.

FIELD

The present invention relates to vehicle interior component.

The present invention also relates to a vehicle interior component comprising a cover formed on a substrate.

BACKGROUND

It is known to provide a vehicle interior component comprising a cover such as a trim panel with a decorative cover.

It would be advantageous to provide an improved vehicle interior component configured to be produced by process in which the cover is formed on a substrate.

It would be advantageous to provide an improved vehicle interior component configured to be produced by process in which the cover is formed on a substrate by an additive manufacturing apparatus.

It would be advantageous to provide an improved vehicle interior component configured to be produced by process in which the cover is formed on a substrate by an apparatus so that the cover may comprise a base layer to provide a structure and a cover layer to provide an effect that may comprise a visual effect and/or a surface effect.

It would be advantageous to provide an improved vehicle interior component configured to be produced by process in which the cover is formed on a substrate by an apparatus so that the cover may comprise a base layer to provide a structure and a cover layer to provide an effect that may comprise a visual effect such as a pattern and/or decorative effect and/or illumination effect and/or a surface effect such as a profile/relief and/or texture.

SUMMARY

The present invention relates to a component for a vehicle interior configured to be illuminated by light from a light source comprising a substrate; and a cover formed on the substrate and comprising an exterior surface. The substrate may be at least partially light-transmissive. The cover may be at least partially light-transmissive. The cover may be configured to present an effect comprising a visual effect and/or a surface effect on the exterior surface. The visual effect may comprise an illumination effect when illuminated by light from the light source. The cover may comprise a base layer and a cover layer configured to present the effect. A coating may provide the exterior surface on the cover layer of the cover and the cover layer may be configured to present the surface effect through the coating. The cover layer may be configured to present the surface effect comprising a texture through the coating. The cover layer may be configured to present the visual effect through the coating. The cover layer may comprise a set of light-transmissive sections configured to provide the illumination effect. The cover layer may comprise a set of light-transmissive sections comprising at least one of voids; holes; and/or openings in the cover layer. The base layer may comprise a set of light transmissive sections; the light-transmissive sections of the cover layer and the light-transmissive sections of the base layer may be configured to present the illumination effect of the cover. The surface effect of the cover may comprise a pattern of the base layer. The base layer may comprise a deposited material formed on the substrate. The deposited material of the base layer may comprise at least one of (a) a resin; and/or (b) a form on the substrate. The cover layer may comprise a coating on a form on the base layer on the substrate. The surface effect on the exterior surface of the cover may be presented by a form on the base layer. The surface effect on the exterior surface of the cover may be presented by a form on the base layer and a pattern on the cover layer.

The present invention relates to a method of producing a component for a vehicle interior configured to be illuminated by light from a light source comprising the steps of providing a substrate; and forming a cover on the substrate to provide an exterior surface. The substrate may be at least partially light-transmissive. The cover may be at least partially light-transmissive. The cover may be configured to present an effect comprising a visual effect and/or a surface effect on the exterior surface. The visual effect may comprise an illumination effect when illuminated by light from the light source. The cover may comprise a base layer and a cover layer configured to present the surface effect. The step of forming the cover on the substrate may comprise the step of applying the base layer with voids on the substrate then applying the cover layer with voids on the base layer; the voids of the base layer and the voids of the cover layer may be configured to provide the illumination effect. The method may comprise the step of curing material of the cover using at least one of ultraviolet (UV) light; UV-A light; UV-B light; UV-C light; light in a wave length created by UV-LED; light in a wave length created by UV-Mercury lamp; hot air; an oven; infrared (IR) radiation; near infrared (NIR) radiation. The method may comprise the step of securing the substrate in a fixture; the substrate may be rotated in the fixture so that the cover layer can be applied.

The present invention relates to a component for a vehicle interior configured to be illuminated by light from a light source comprising a substrate; and a cover comprising a cover layer formed on the substrate and comprising an exterior surface. The substrate may be at least partially light-transmissive. The cover may be at least partially light-transmissive. The cover may be configured to present an effect comprising a visual effect and/or a surface effect on the exterior surface. The visual effect may comprise an illumination effect when illuminated by light from the light source. The cover may be at least partially opaque. The component may be formed with an apparatus comprising a print bar; the print bar may be configured to deposit at least one of (a) a base layer formed on the substrate; (b) the cover layer; and/or (c) a coating. The print bar may be configured to deposit at least one of ink; paint; clear coating; color coating; and/or plastic material.

The present invention relates to a component for a vehicle interior configured to be illuminated by light from a light source comprising a substrate and a cover formed on the substrate and comprising an exterior surface. The substrate may be at least partially light-transmissive. The cover may be at least partially light-transmissive. The cover may be configured to present an effect comprising a visual effect and/or a surface effect on the exterior surface. The visual effect may comprise an illumination effect when illuminated by light from the light source. The cover may comprise a base layer and a cover layer configured to present the effect. The base layer of the cover may be formed on the substrate. The cover layer of the cover may be formed on the base layer of the cover. A coating may be formed on the cover layer of the cover. The coating may provide the exterior surface on the cover layer of the cover. The cover layer may be configured to present the surface effect of the cover. The cover layer may be configured to present the visual effect of the cover. A coating may provide the exterior surface on the cover layer of the cover and the cover layer may be configured to present the surface effect through the coating of the cover. The coating may provide the exterior surface on the cover layer of the cover and the cover layer may be configured to present the surface effect comprising a texture through the coating of the cover. The coating may provide the exterior surface on the cover layer of the cover and the cover layer may be configured to present the visual effect through the coating of the cover. The cover layer of the cover may comprise a set of light-transmissive sections. The light-transmissive sections of the cover layer may be configured to provide the illumination effect of the cover. The light-transmissive sections may comprise voids in the cover layer. The light-transmissive sections may comprise holes in the cover layer. The light-transmissive sections may comprise openings in the cover layer. The cover layer may be at least partially light transmissive. The base layer of the cover may be at least partially light transmissive. The base layer of the cover may comprise a light-transmissive material. The base layer of the cover may comprise a set of light transmissive sections. The light-transmissive sections of the base layer may be configured to provide the illumination effect of the cover. The light-transmissive sections of the cover layer may align with the light-transmissive sections of the base layer. The light-transmissive sections of the cover layer and the light-transmissive sections of the base layer may be configured to present the illumination effect of the cover. The cover may comprise the base layer and the cover layer and a coating. The coating may comprise a light-transmissive coating. The visual effect of the cover may comprise a pattern of the cover layer of the cover. The surface effect of the cover may comprise a pattern of the base layer of the cover. The base layer of the cover may comprise a deposited material formed on the substrate. The deposited material of the base layer of the cover may comprise a resin. The deposited material of the base layer of the cover may comprise a form on the substrate. The cover layer may comprise a coating on the form of the base layer on the substrate. The form may be configured to present the surface effect. The cover layer may comprise a coating. The cover layer may comprise an ink. The cover layer may comprise a formed material on the substrate. The cover layer may comprise a formed material on the base layer of the cover. The formed material may comprise a color. The color may comprise at least one of (a) black and/or (b) yellow and/or (c) magenta and/or (d) cyan. The color may comprise at least one of (a) black and/or (b) yellow and/or (c) magenta and/or (d) cyan and/or (e) white and/or (f) metallic color. The cover layer may comprise an ink applied on the base layer of the cover. The substrate may comprise a material; the material of the substrate may comprise of at least one of resin, plastic, plastic resin, thermoplastic resin, thermoset resin, metal, alloy, aluminum, natural fiber, wood, bamboo. The base layer may comprise a material; the material of the base layer may comprise at least one of plastic, resin, polyurethane resin, polyacrylic resin, polymethacrylic resin, polyepoxide resin, pigments, solvents, dyes, flakes, monomers, additives, fillers, photoinitiators. The cover layer may comprise a material; the material of the cover layer may comprise at least one of plastic, ink, resin, polyurethane resin, polyacrylic resin, polymethacrylic resin, polyepoxide resin, pigments, solvents, dyes, flakes, monomers, additives, fillers, photoinitiators. The cover may comprise a coating; the coating may comprise at least one of plastic, resin, optically clear material, coating, film layer. The component may comprise a coating formed on the cover layer. The coating may comprise a clear coating. The coating may comprise the exterior surface of the cover. The cover layer may comprise a set of holes; a coating may be applied on the cover layer and in the set of holes of the cover layer. The cover layer may be configured to present the illumination effect of the cover through a set of holes in the cover layer; a coating may provide the exterior surface on the cover layer of the cover and the cover layer may be configured to present the surface effect through the coating of the cover. The visual effect of the cover may comprise the illumination effect through the set of holes in the cover layer and the surface effect through a coating on the cover layer of the cover. The surface effect on the exterior surface of the cover may be presented by a pattern on the cover layer of the cover. The pattern may comprise a wood grain effect. The pattern may comprise a color effect. The pattern may comprise a relief. The pattern may comprise a relief; the relief may comprise at least one of contour, profile, texture, haptic surface, sculptural design, plastic formation. The pattern may comprise a texture. The pattern may comprise a profile. The pattern may comprise a printed pattern. The surface effect on the exterior surface of the cover may be presented by a form on the base layer. The form on the base layer may comprise a profile. The surface effect on the exterior surface of the cover may be presented by a form on the base layer of the cover and a pattern on the cover layer of the cover. The component may be formed by a process comprising the steps of applying the base layer to the substrate then applying the cover layer to the substrate. The cover layer may be applied on the base layer. The process may comprise the step of securing the substrate in a fixture. The substrate may be rotated in the fixture so that the cover layer can be applied. The printing head may be configured with the substrate in a fixture; the substrate and/or printing head and maybe rotated so that the base layer, the cover layer and/or the exterior layer can be applied on and around the substrate. The component may be formed by a process comprising the steps of applying the base layer to the substrate then applying the cover layer over the substrate then applying the coating over the substrate. The coating may comprise a functional coating. The coating may comprise a protective coating in the cover. The coating may comprise a finish for the exterior surface of the cover. The coating may comprise at least one of a (a) gloss finish; (b) matte finish; (c) surface texture; (d) surface finish; (e) smooth finish; (f) rough finish; (g) protective layer; (h) chemical-resistive layer; (i) scratch-resistant layer; (j) sunlight exposure protective layer; (k) corrosion resistant layer. The visual effect of the cover may comprise a multi-color effect. The multi-color effect may comprise a grain pattern. The multi-color effect may comprise a grain pattern with a texture. The visual effect may comprise a grain pattern with texture providing the surface effect. The surface effect may comprise a texture effect; the texture effect may comprise a smooth texture over the grain pattern. The component may comprise a module comprising the light source. The component may be configured to present a user interface at the exterior surface of the cover; the user interface may comprise the visual effect. The component may comprise a module comprising the light source configured to present the user interface. The user interface may comprise the illumination effect; the illumination effect may comprise an illuminated image. The illuminated image may comprise a set of icons.

The present invention relates to a method of producing a component for a vehicle interior configured to be illuminated by light from a light source comprising the steps of providing a substrate and forming a cover on the substrate to provide an exterior surface. The substrate may be at least partially light-transmissive. The cover may be at least partially light-transmissive. The cover may be configured to present an effect comprising a visual effect and/or a surface effect on the exterior surface. The visual effect may comprise an illumination effect when illuminated by light from the light source. The cover may comprise a base layer and a cover layer configured to present the surface effect. The base layer of the cover may be formed on the substrate. The cover layer of the cover may be formed on the base layer of the cover. A coating may be formed on the cover layer of the cover. The coating may provide the exterior surface on the cover layer of the cover. The cover layer may be configured to present the surface effect of the cover. The step of forming the cover on the substrate may comprise the step of applying a base layer on the substrate. The step of forming the cover on the substrate may comprise the step of applying a cover layer on the substrate. The step of forming the cover on the substrate may comprise the step of applying a coating on the substrate. The step of forming the cover on the substrate may comprise the step of applying a base layer on the substrate then applying a cover layer on the base layer. The step of forming the cover on the substrate may comprise the step of applying a coating on the base layer. The step of forming the cover on the substrate may comprise the step of applying a base layer on the substrate then applying a cover layer with voids on the base layer. The step of forming the cover on the substrate may comprise the step of applying a base layer with voids on the substrate then applying a cover layer with voids on the base layer. The voids of the base layer and voids of the cover layer may be configured to provide the illumination effect of the cover. The method may comprise the step of curing material of the cover using at least one of ultraviolet (UV) light, UV-A light, UV-B light, UV-C light, light in a wave length created by UV-LED, light in a wave length created by UV-Mercury lamp, by hot air; in an oven; by infrared (IR) radiation; by near infrared (NIR) radiation. The component may comprise an assembled component configured for use in the vehicle interior.

The present invention relates to a component for a vehicle interior configured to be illuminated by light from a light source comprising a substrate and a cover comprising a cover layer formed on the substrate and comprising an exterior surface. The substrate may be at least partially light-transmissive. The cover may be at least partially light-transmissive. The cover may be configured to present an effect comprising a visual effect and/or a surface effect on the exterior surface. The visual effect may comprise an illumination effect when illuminated by light from the light source. The cover may be at least partially opaque. The cover may comprise a base layer; the base layer of the cover may comprise an opaque material formed on the substrate. The cover layer of the cover may comprise an opaque material formed on the base layer of the cover. A coating may be formed on the cover layer of the cover. The coating may provide the exterior surface on the cover layer of the cover. The cover layer may be configured to present the surface effect of the cover. A coating may provide the exterior surface on the cover layer of the cover and the cover layer may be configured to present the surface effect through the coating of the cover. The cover layer of the cover may comprise a set of light-transmissive sections. The cover may comprise an opaque mask layer and a set of light-transmissive sections. The cover layer of the cover may comprise a set of light-transmissive sections comprising at least one of a void and/or a light-transmissive filling. The component may be formed with an apparatus; the apparatus may comprise at least one of a print bar, an ink jet printer, a three-dimensional printer, an additive manufacturing apparatus, a pad printer, a screen printer. The component may be formed with an apparatus comprising a print bar; the print bar may be configured to deposit the base layer and the cover layer. The print bar may be configured to deposit a coating. The print bar may be configured to deposit at least one of ink, paint, clear coating, color coating, plastic material.

The present invention relates to a component for a vehicle interior configured to be illuminated by light from a light source comprising a substrate and a cover comprising a cover layer formed on the substrate and comprising an exterior surface. The substrate may be at least partially light-transmissive. The cover may be at least partially light-transmissive. The cover may be configured to present an effect comprising a visual effect and/or a surface effect on the exterior surface. The visual effect may comprise an illumination effect when illuminated by light from the light source. The cover may be at least partially opaque. The cover may comprise a base layer; the base layer of the cover may comprise an opaque material formed on the substrate. The cover layer of the cover may comprise an opaque material formed on the base layer of the cover. A coating may be formed on the cover layer of the cover. The coating may provide the exterior surface on the cover layer of the cover. The cover layer may be configured to present the surface effect of the cover. A coating may provide the exterior surface on the cover layer of the cover and the cover layer may be configured to present the surface effect through the coating of the cover. The cover layer of the cover may comprise a set of light-transmissive sections. The cover may comprise an opaque mask layer and a set of light-transmissive sections. The cover layer of the cover may comprise a set of light-transmissive sections comprising at least one of a void and/or a light-transmissive filling. The component may be formed with an apparatus; the apparatus may comprise at least one of a print bar, an ink jet printing head, an ink jet printer, a continuous ink jet printer, a drop on demand ink jet printer, a three-dimensional printer, an additive manufacturing apparatus, a pad printer, a screen printer. The component may be formed with an apparatus comprising a print bar; the print bar may be configured to deposit the base layer and the cover layer. The print bar may be configured to deposit a coating. The print bar may be configured to deposit at least one of ink, paint, clear coating, color coating, plastic material.

The present invention relates to a component for a vehicle interior configured to be decorated by deposit of material by an apparatus comprising a substrate and a cover formed on the substrate and comprising an exterior surface. The substrate may be at least partially decorated. The cover may be at least partially decorated. The cover may be configured to present an effect comprising a visual effect and/or a surface effect on the exterior surface. The visual effect may comprise a decorative effect produced by the material on the substrate. The cover may comprise a base layer and a cover layer configured to present the effect. The apparatus may comprise a printer. Deposit of material may comprise printing. The apparatus may comprise a digital printer and the deposit of material may comprise digital printing. The apparatus may comprise at least one of an ink jet printer, a continuous ink jet printer, a drop on demand ink jet printer, a pad printer, a screen printer, a three-dimensional printer, an additive manufacturing apparatus. The apparatus may comprise an ink jet printing head. The ink jet printing head may comprise at least one of a print bar, the print bar may be configured to deposit the base layer and the cover layer.

FIGURES

FIGS. 7A to 7C are schematic perspective views of a method to produce a vehicle interior component according to an exemplary embodiment.

FIG. 19A is a schematic perspective view of a vehicle interior component according to an exemplary embodiment.

FIG. 19B is a schematic perspective view of a vehicle interior component according to an exemplary embodiment.

FIG. 19C is a schematic perspective view of a vehicle interior component according to an exemplary embodiment.

FIG. 19D is a schematic perspective view of a vehicle interior component according to an exemplary embodiment.

FIG. 20A is a schematic perspective cut-away view of a vehicle interior according to an exemplary embodiment.

FIG. 20B is a schematic partial perspective view of a vehicle interior component shown as an instrument panel according to an exemplary embodiment.

FIG. 21A is a schematic perspective view of a vehicle interior component shown as a door panel according to an exemplary embodiment.

FIG. 21B is a schematic perspective cut-away view of a vehicle interior component according to an exemplary embodiment.

FIGS. 26A to 26B are schematic flow diagrams of methods to produce a vehicle interior component according to an exemplary embodiment.

DESCRIPTION

Figure 1A:
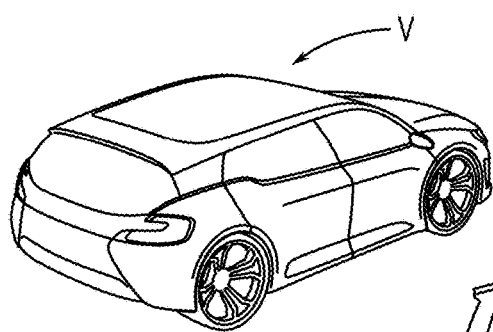
FIG. 1A is a schematic perspective view of a vehicle according to an exemplary embodiment.
Figure 1B:
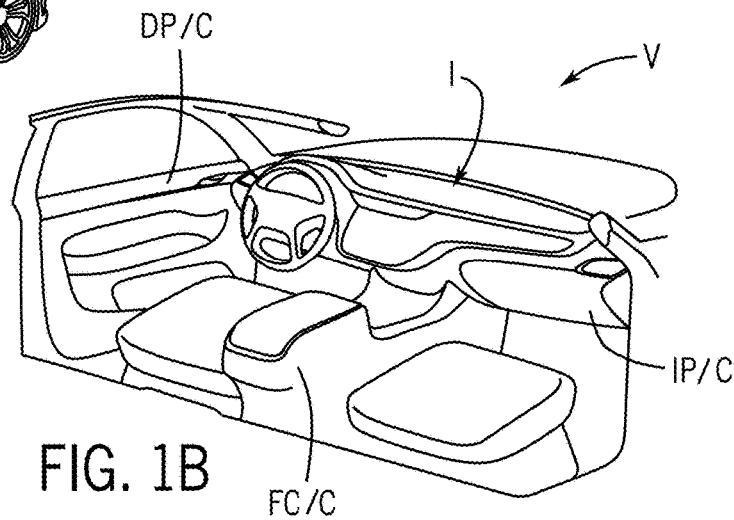
FIG. 1B is a schematic perspective cut-away view of a vehicle showing an interior according to an exemplary embodiment.

Referring to FIGS. 1A and 1B a vehicle V with an interior I is shown according to an exemplary embodiment; as indicated, vehicle interior I may comprise components C such as an instrument panel, console shown as floor console FC and panels such as door panel DP.

Figure 2A:
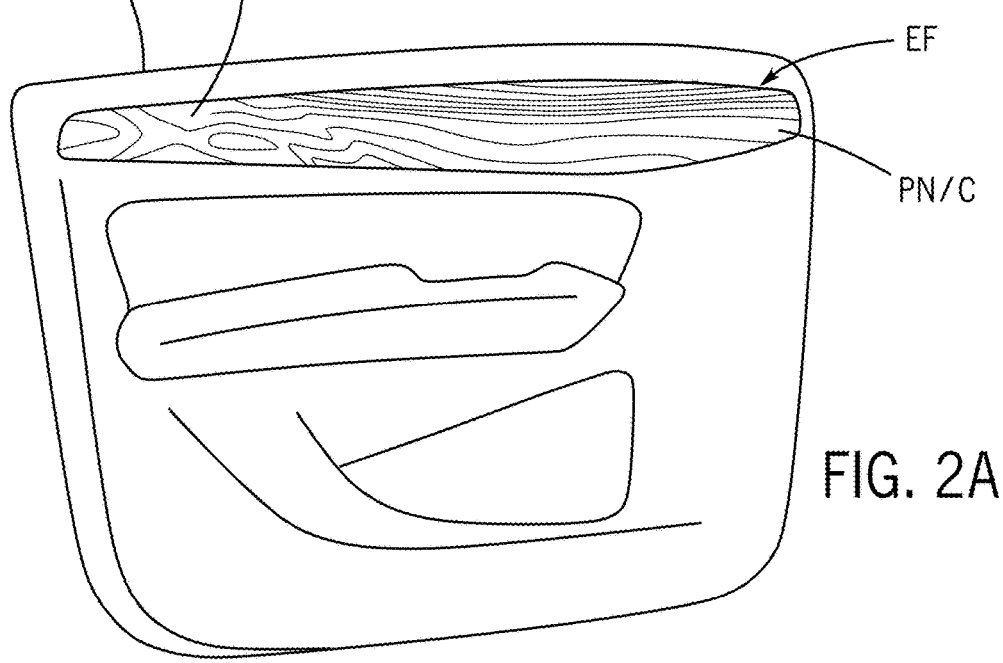
FIG. 2A is a schematic perspective view of a vehicle interior component shown as a door panel according to an exemplary embodiment.
Figure 2B:
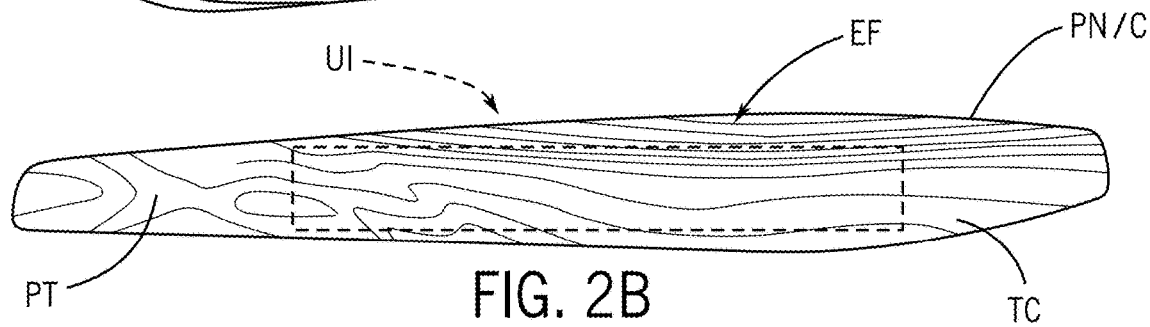
FIG. 2B is a schematic plan view of a vehicle interior component according to an exemplary embodiment.
Figure 3A:
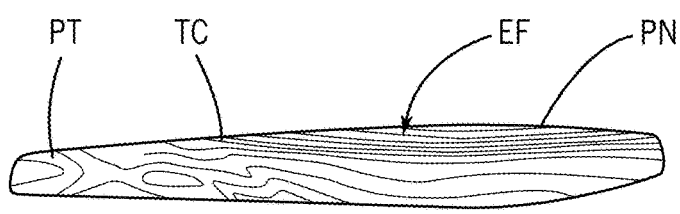
FIG. 3A is a schematic plan view of a vehicle interior component according to an exemplary embodiment.
Figure 3B:
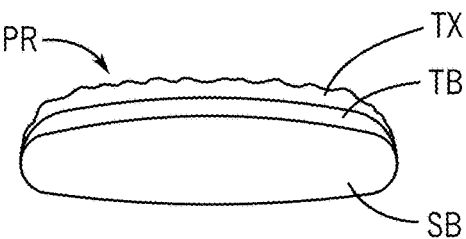
FIG. 3B is a schematic section view of a vehicle interior component according to an exemplary embodiment.
Figure 3C:
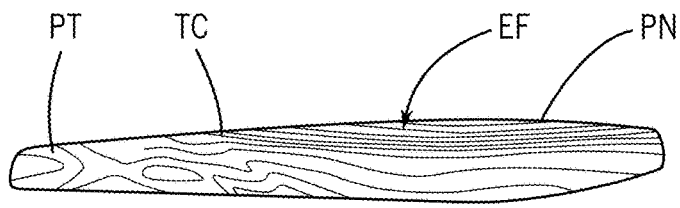
FIG. 3C is a schematic plan view of a vehicle interior component according to an exemplary embodiment.
Figure 3D:
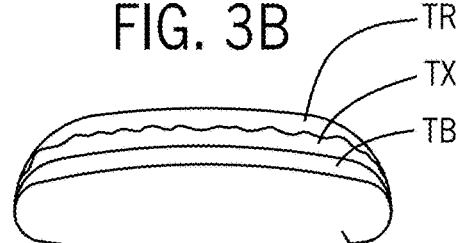
FIG. 3D is a schematic section view of a vehicle interior component according to an exemplary embodiment.
Figure 3E:
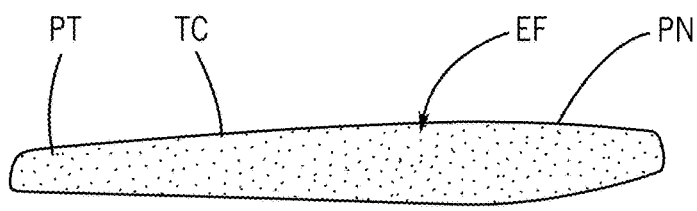
FIG. 3E is a schematic plan view of a vehicle interior component according to an exemplary embodiment.
Figure 3F:
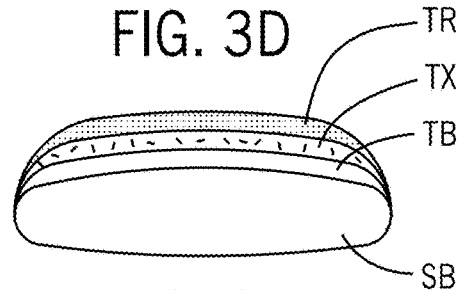
FIG. 3F is a schematic section view of a vehicle interior component according to an exemplary embodiment.
Figure 3G:
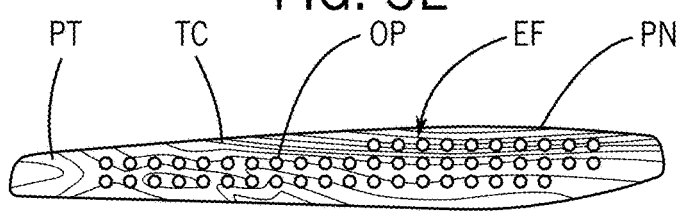
FIG. 3G is a schematic plan view of a vehicle interior component according to an exemplary embodiment.
Figure 3H:
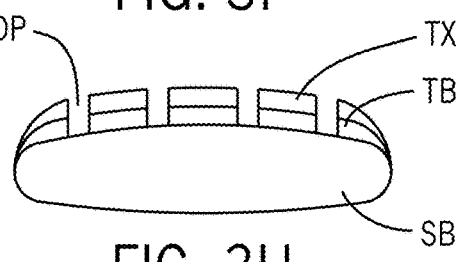
FIG. 3H is a schematic section view of a vehicle interior component according to an exemplary embodiment.
Figure 3I:
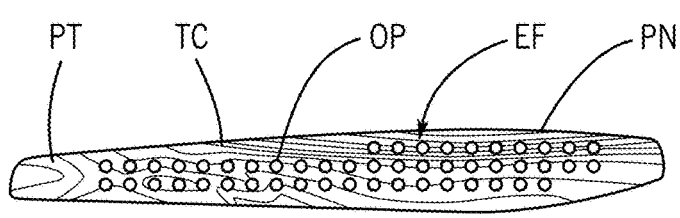
FIG. 3I is a schematic plan view of a vehicle interior component according to an exemplary embodiment.
Figure 3J:
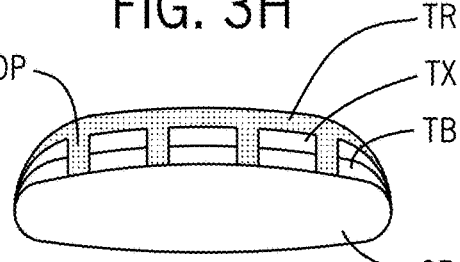
FIG. 3J is a schematic section view of a vehicle interior component according to an exemplary embodiment.
Figure 3K:
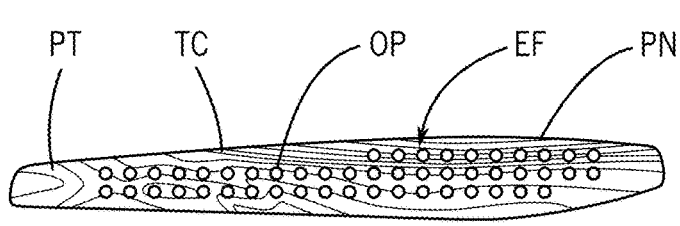
FIG. 3K is a schematic plan view of a vehicle interior component according to an exemplary embodiment.
Figure 3L:
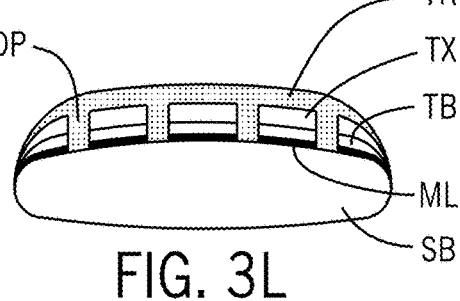
FIG. 3L is a schematic section view of a vehicle interior component according to an exemplary embodiment.
Figure 4A:
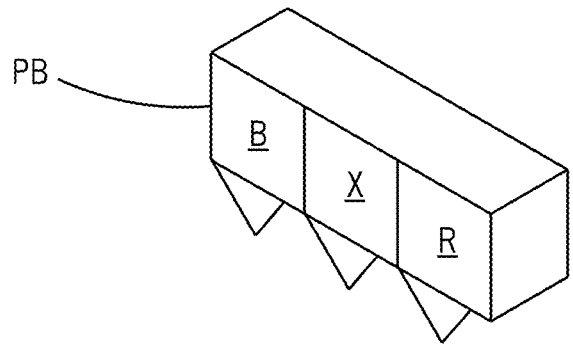
FIG. 4A is a schematic partial perspective view of an apparatus for use in a method to produce a vehicle interior component according to an exemplary embodiment.
Figure 4B:
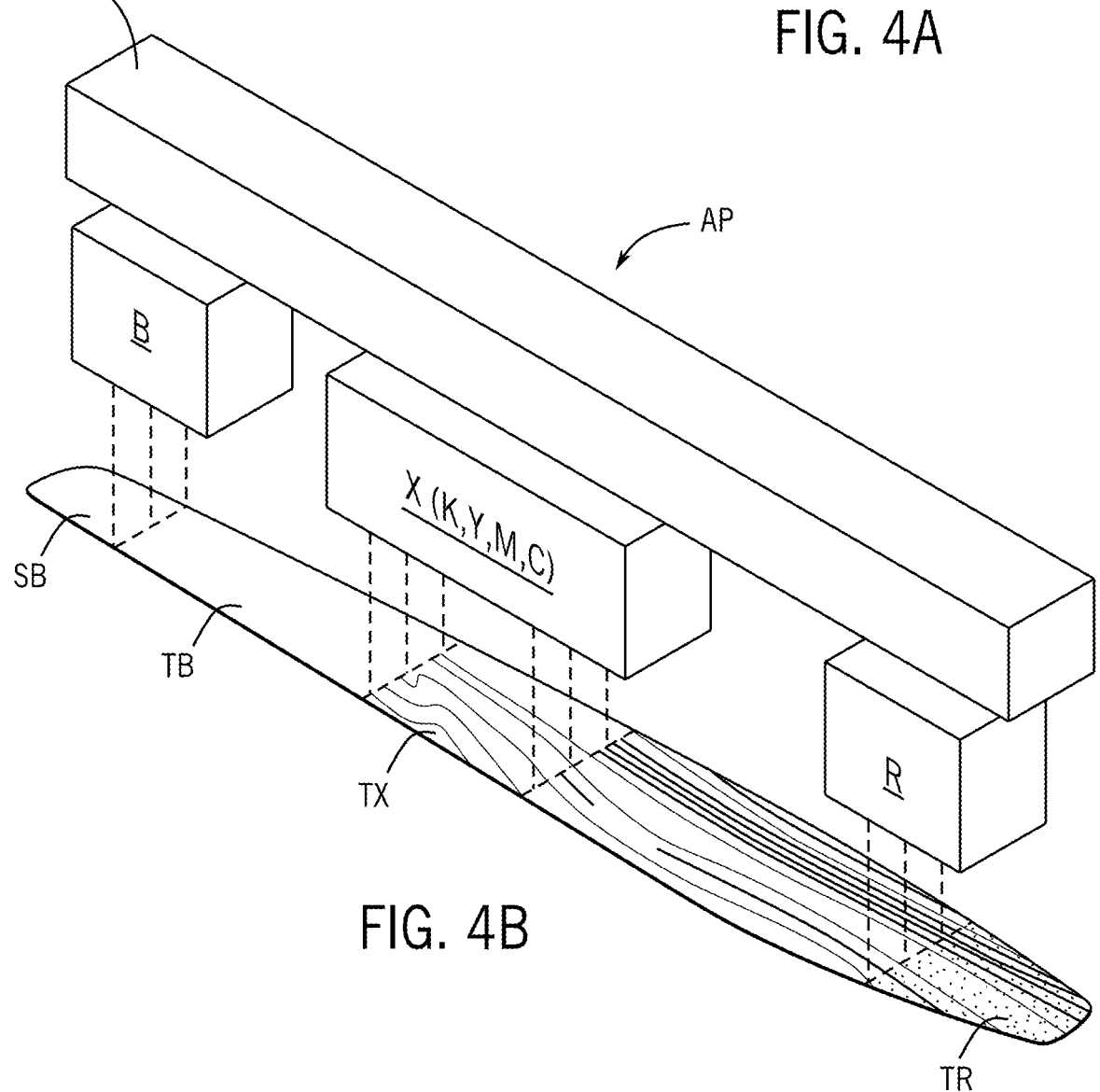
FIG. 4B is a schematic perspective view of a method to produce a vehicle interior component according to an exemplary embodiment.
Figure 5A:
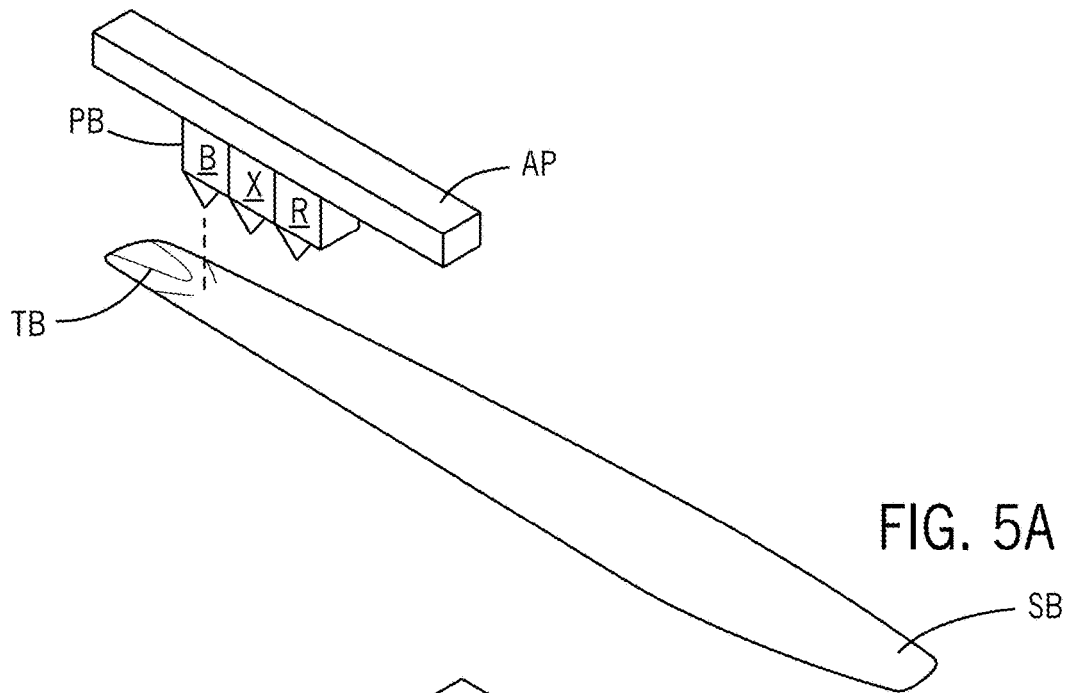
FIGS. 5A to 5C are schematic perspective views of a method to produce a vehicle interior component according to an exemplary embodiment.
Figure 5B:
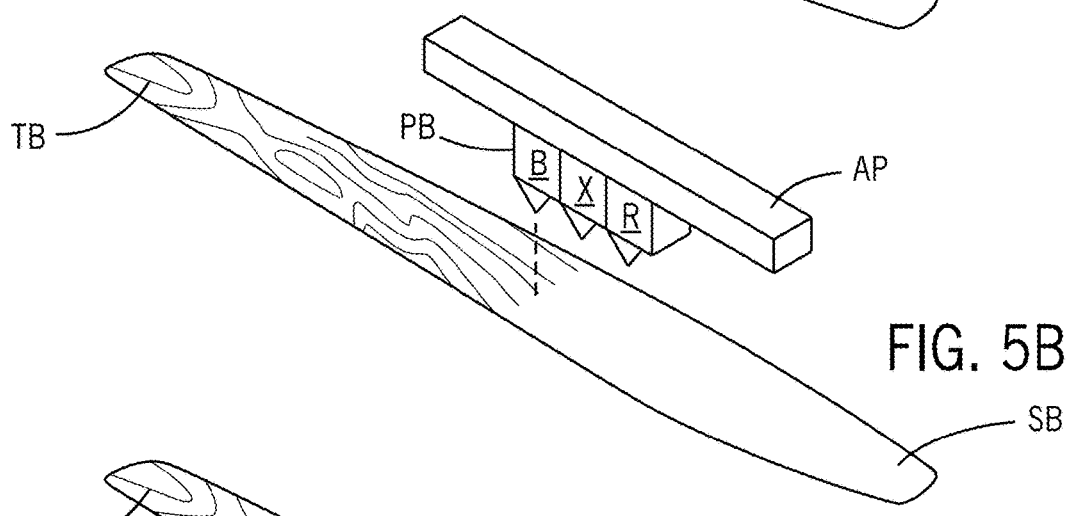
Figure 5C:
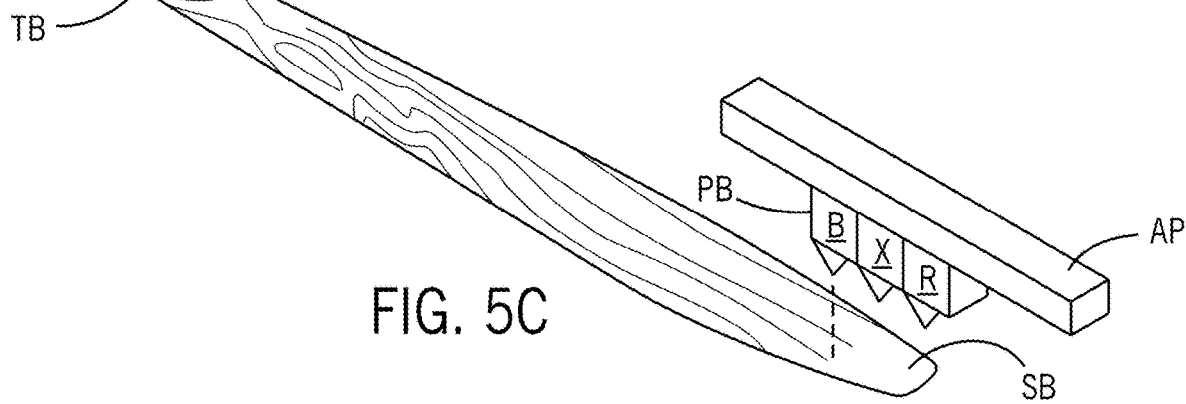
Figure 6A:
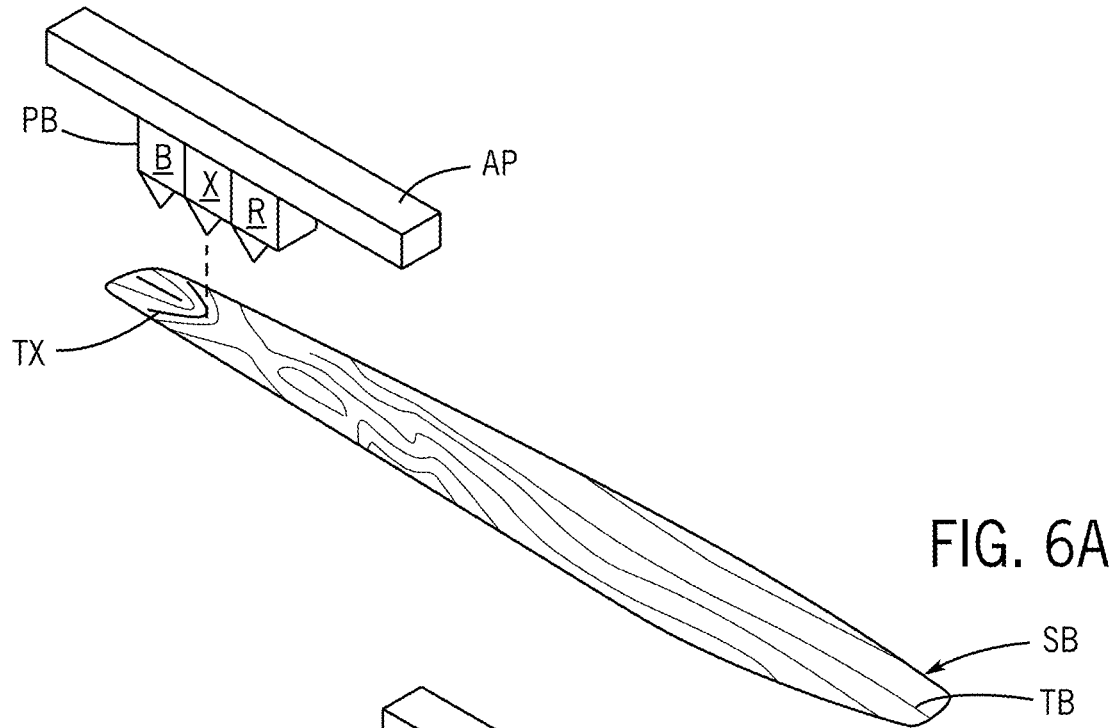
FIGS. 6A to 6C are schematic perspective views of a method to produce a vehicle interior component according to an exemplary embodiment.
Figure 6B:
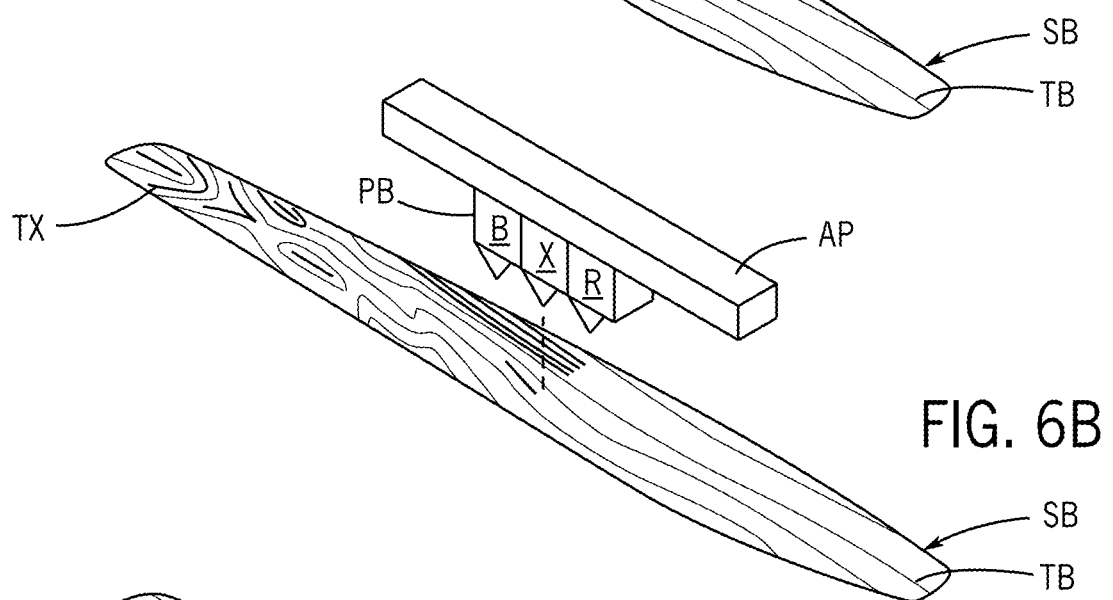
Figure 6C:
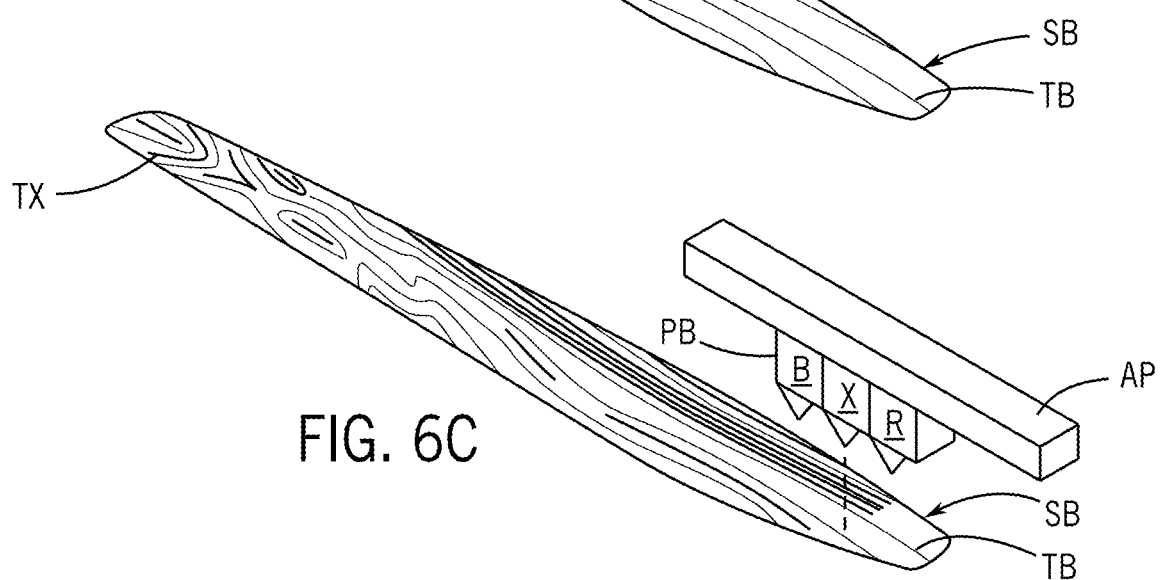
Figure 8:
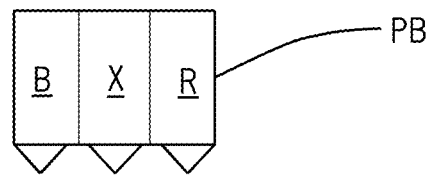
FIG. 8 is a schematic partial section view of an apparatus for use in a method to produce a vehicle interior component according to an exemplary embodiment.
Figure 9A:
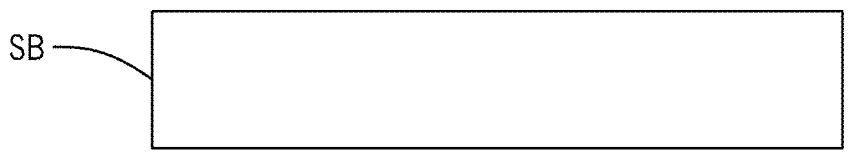
FIGS. 9A to 9D are schematic section views of a method to produce a vehicle interior component according to an exemplary embodiment.
Figure 9B:
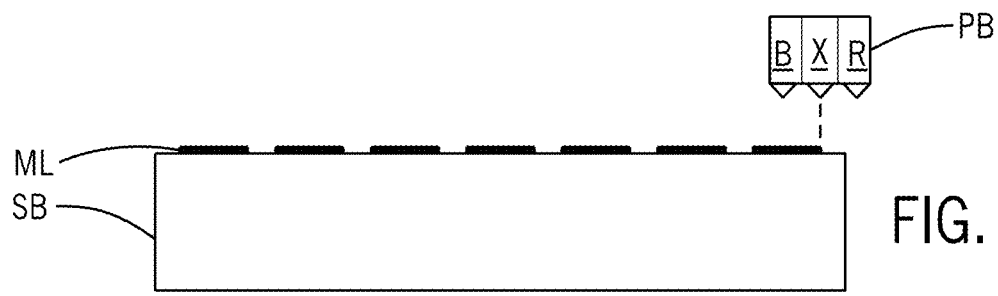
Figure 9C:
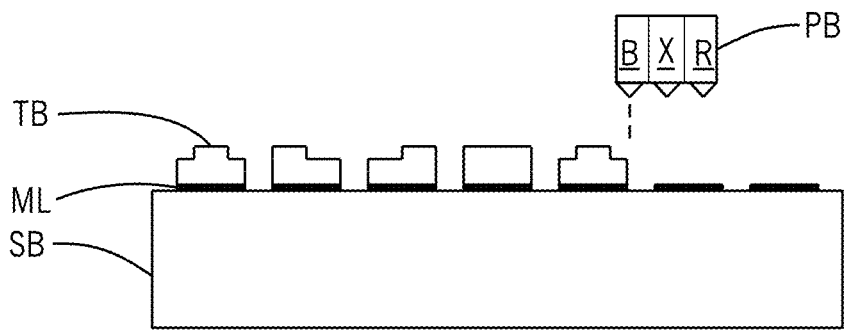
Figure 9D:
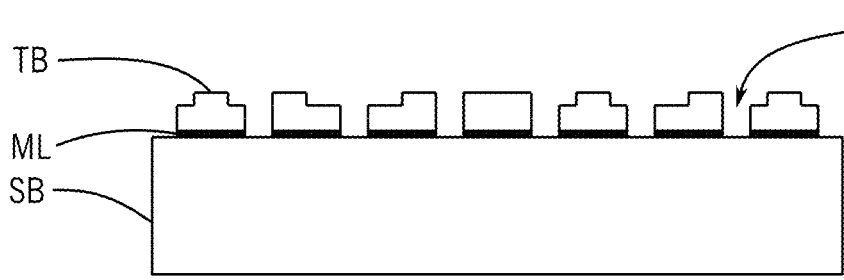
Figure 10A:
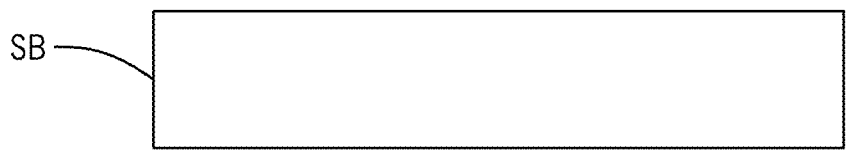
FIGS. 10A to 10E are schematic section views of a method to produce a vehicle interior component according to an exemplary embodiment.
Figure 10B:
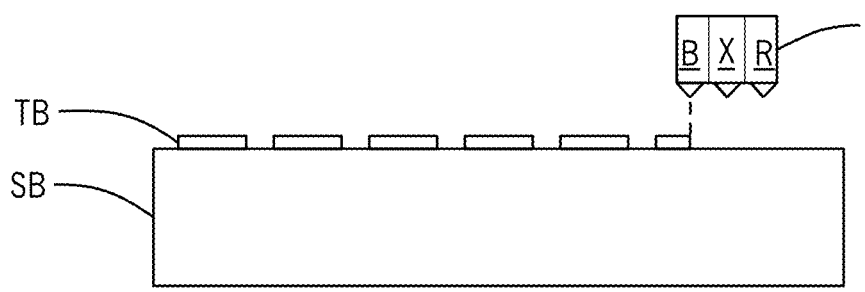
Figure 10C:
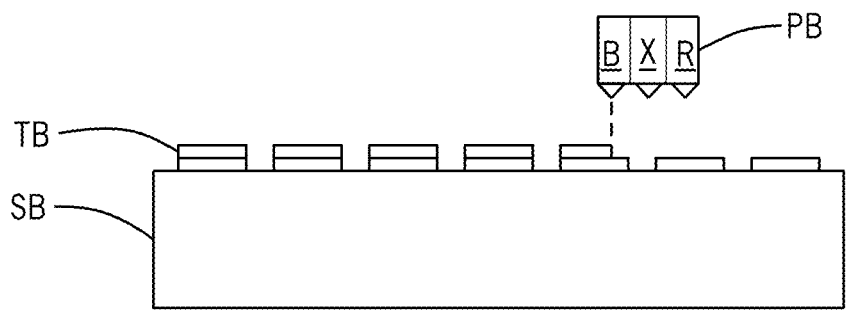
Figure 10D:
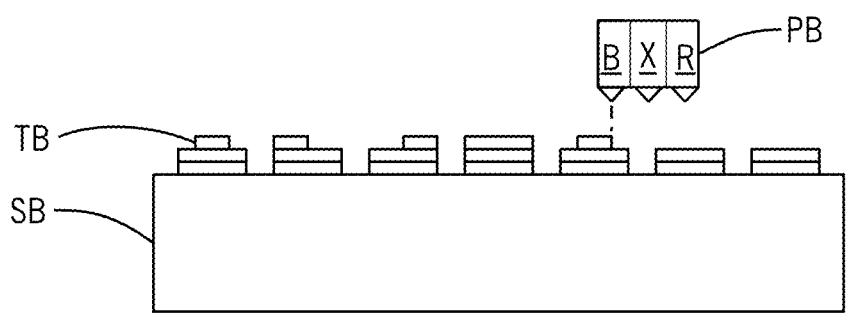
Figure 10E:
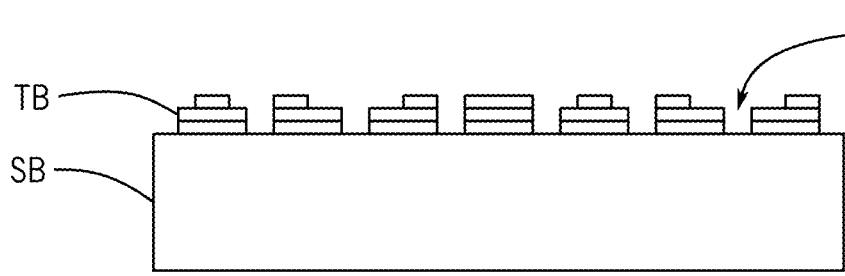
Figure 11A:
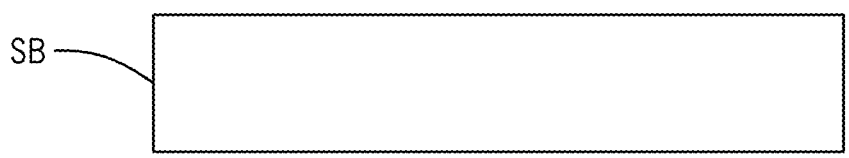
FIGS. 11A to 11C are schematic section views of a method to produce a vehicle interior component according to an exemplary embodiment.
Figure 11B:
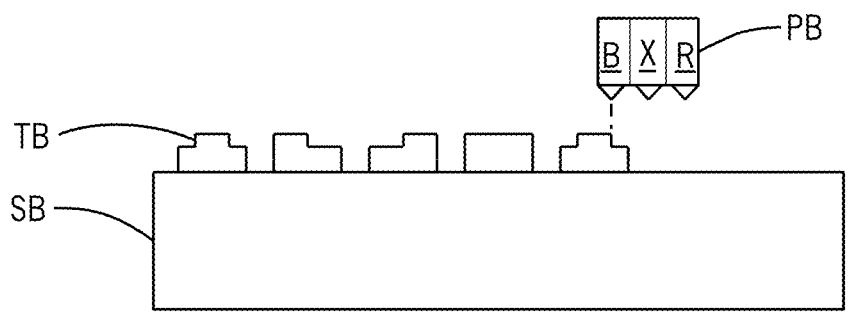
Figure 11C:
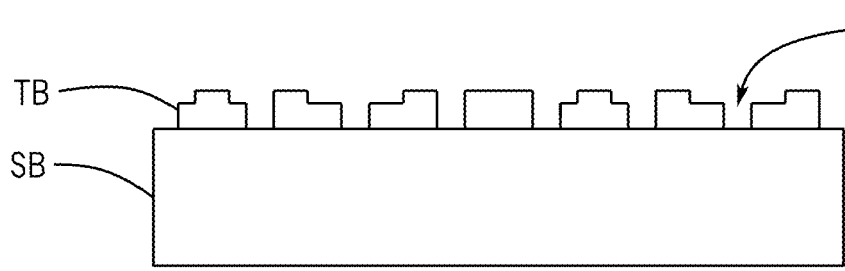
Figure 12A:
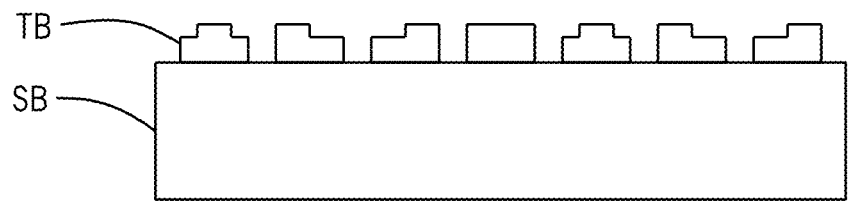
FIGS. 12A to 12C are schematic section views of a method to produce a vehicle interior component according to an exemplary embodiment.
Figure 12B:
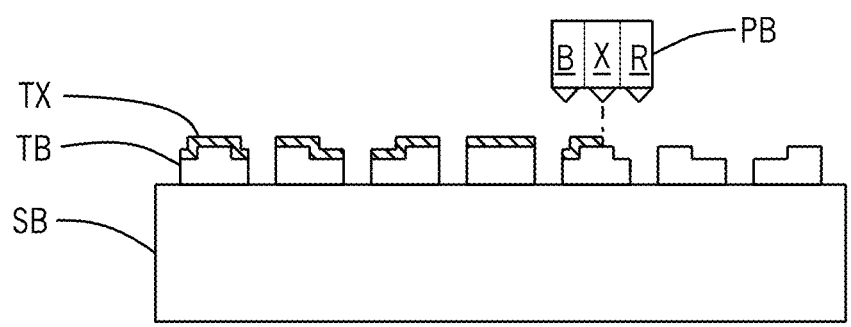
Figure 12C:
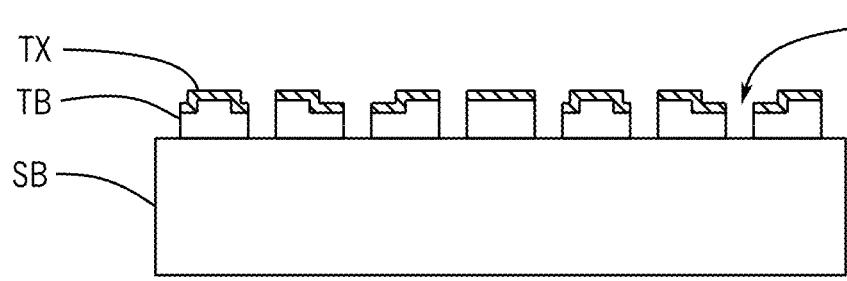
Figure 13A:
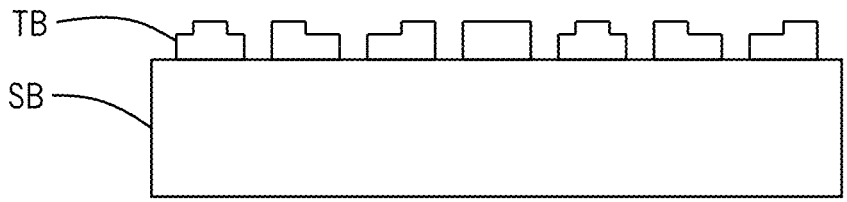
FIGS. 13A to 13D are schematic section views of a method to produce a vehicle interior component according to an exemplary embodiment.
Figure 13B:
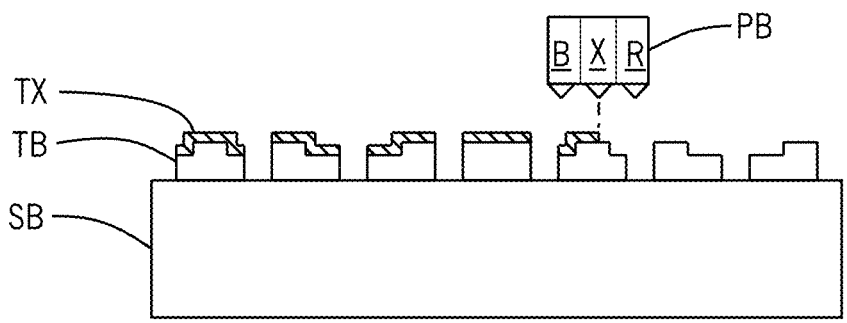
Figure 13C:
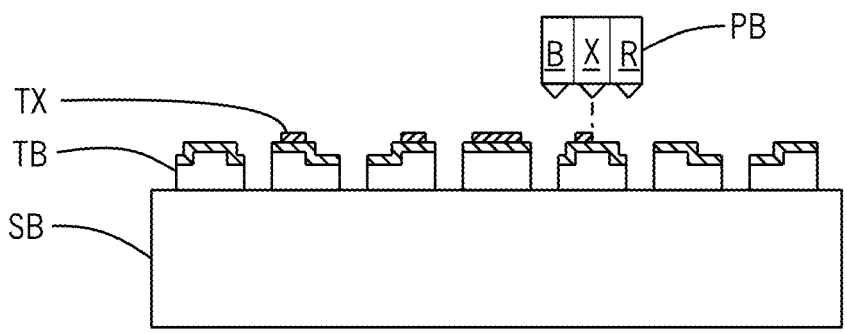
Figure 13D:
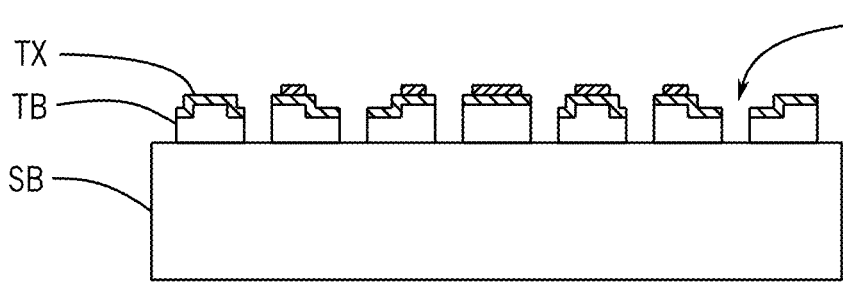
Figure 14A:
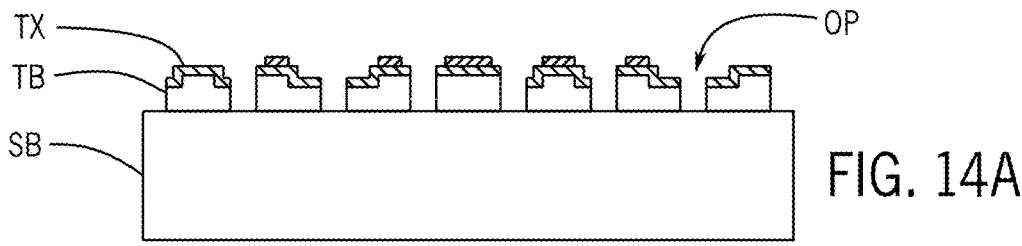
FIGS. 14A to 14I are schematic section views of a method to produce a vehicle interior component according to an exemplary embodiment.
Figure 14B:
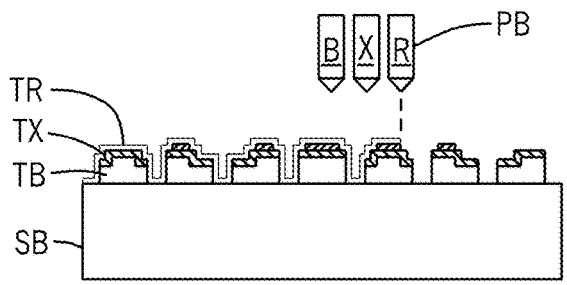
Figure 14C:
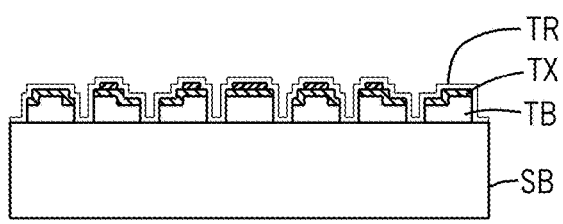
Figure 14D:
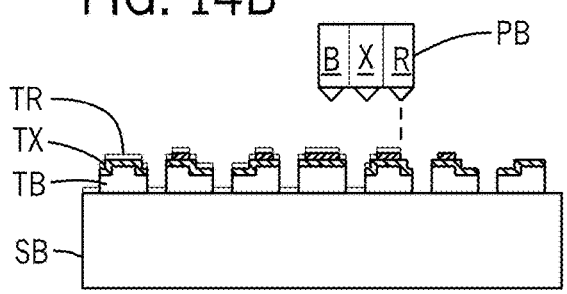
Figure 14E:
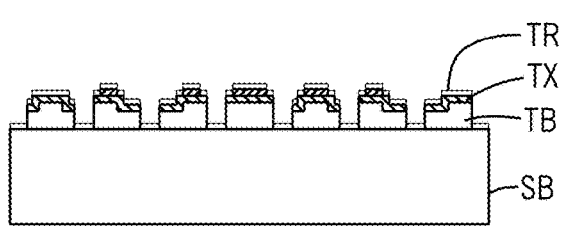
Figure 14F:
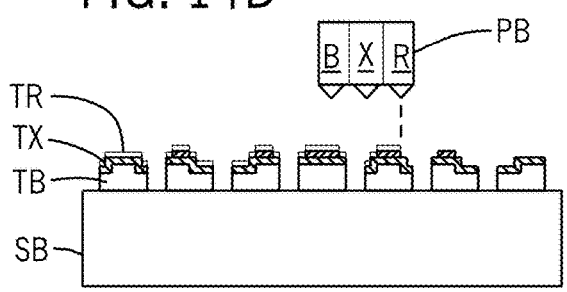
Figure 14G:
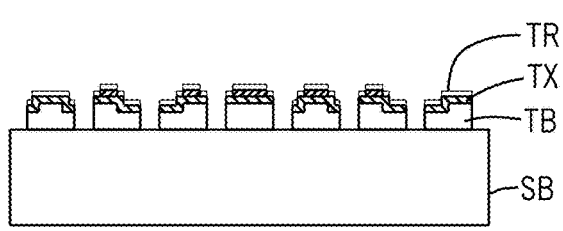
Figure 14H:
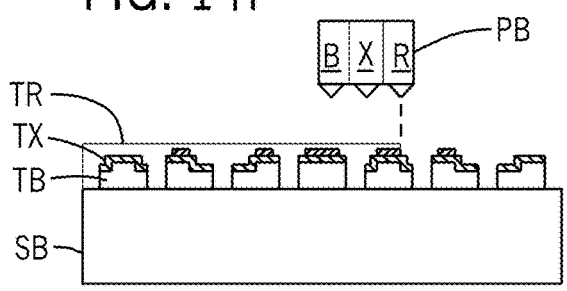
Figure 14I:
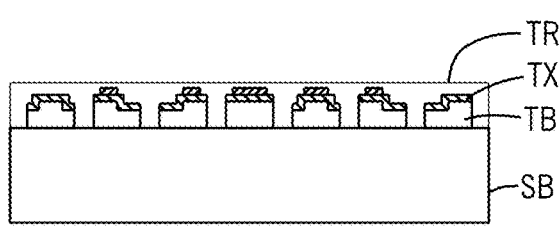
Figure 15A:
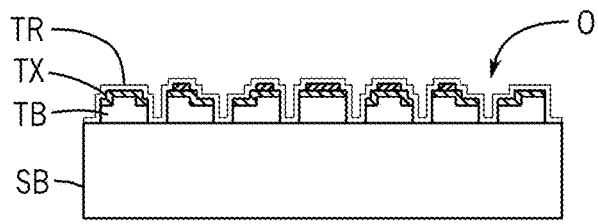
FIGS. 15A to 15J are schematic section views of vehicle interior components according to an exemplary embodiment.
Figure 15B:
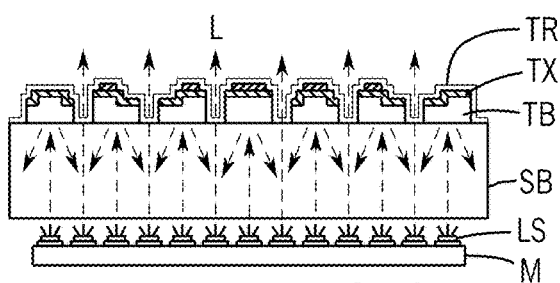
Figure 15C:
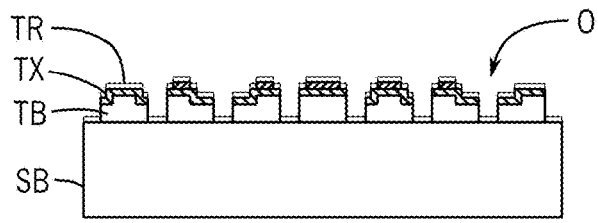
Figure 15D:
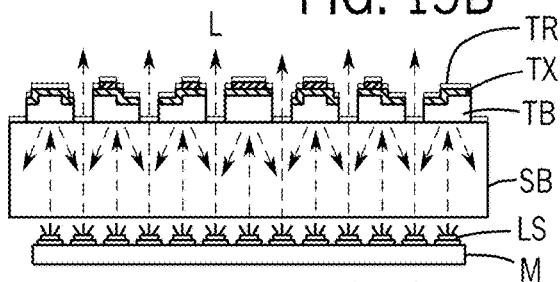
Figure 15E:
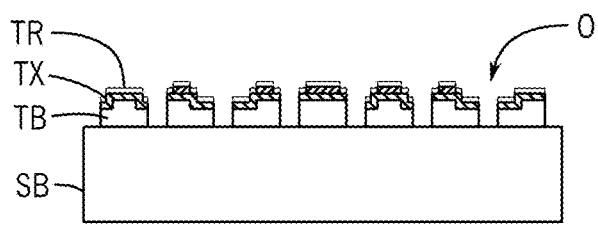
Figure 15F:
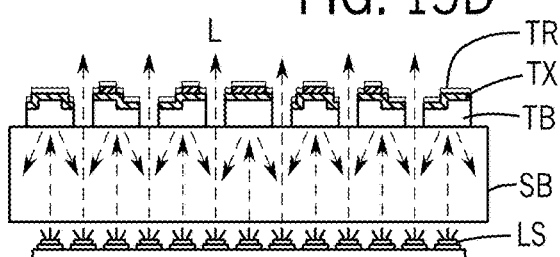
Figure 15G:
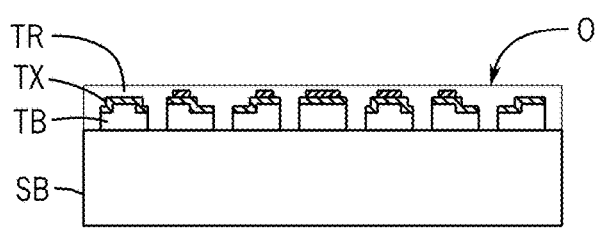
Figure 15H:
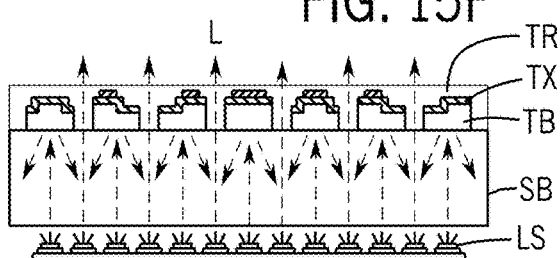
Figure 15I:
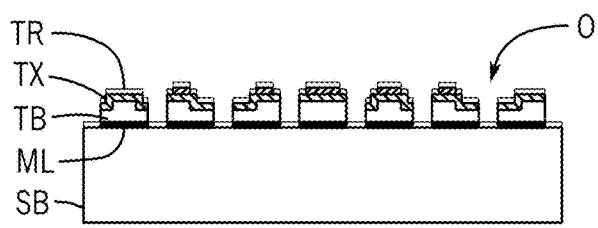
Figure 15J:
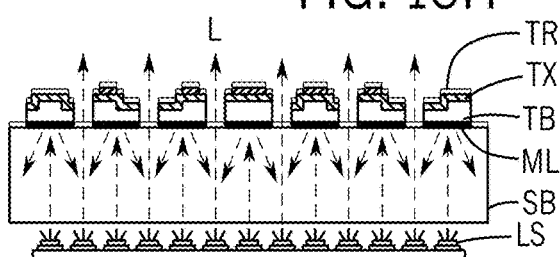
Figure 16A:
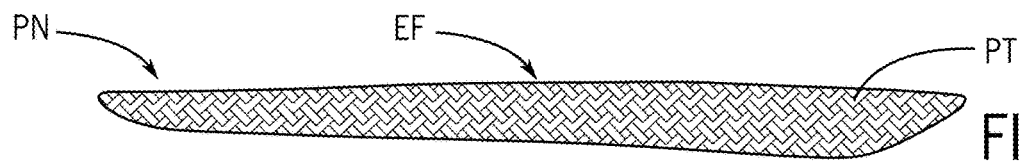
FIG. 16A is a schematic plan view of a vehicle interior component according to an exemplary embodiment.
Figure 16B:
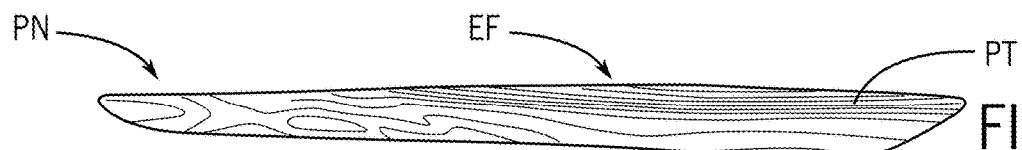
FIG. 16B is a schematic plan view of a vehicle interior component according to an exemplary embodiment.
Figure 16C:
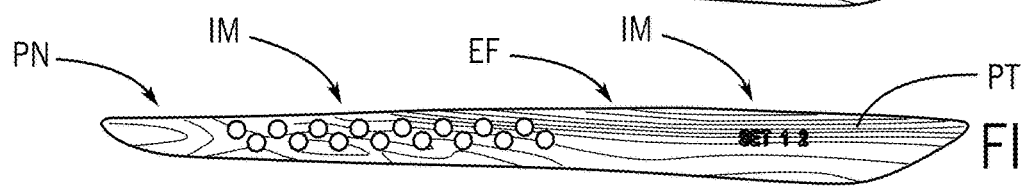
FIG. 16C is a schematic plan view of a vehicle interior component according to an exemplary embodiment.
Figure 16D:
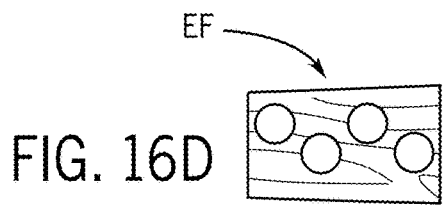
FIG. 16D is a schematic cut-away plan view of a vehicle interior component according to an exemplary embodiment.
Figure 16E:
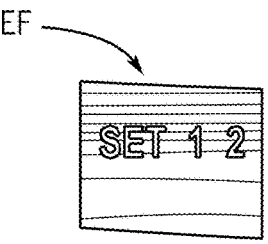
FIG. 16E is a schematic cut-away plan view of a vehicle interior component according to an exemplary embodiment.
Figure 17:
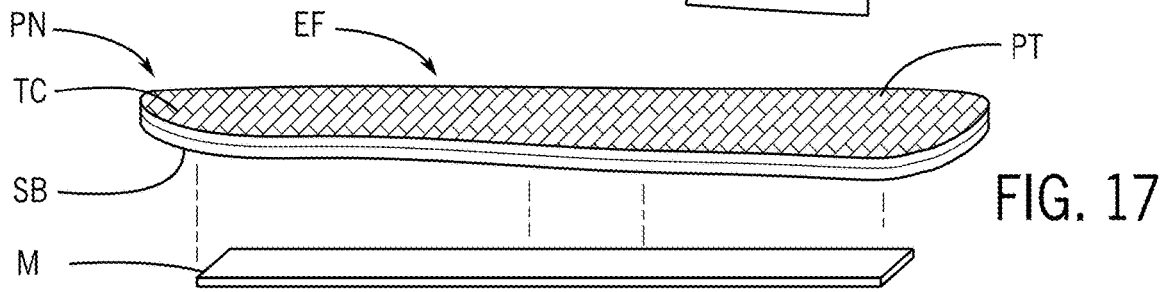
FIG. 17 is a schematic exploded view of a vehicle interior component according to an exemplary embodiment.
Figure 18A:
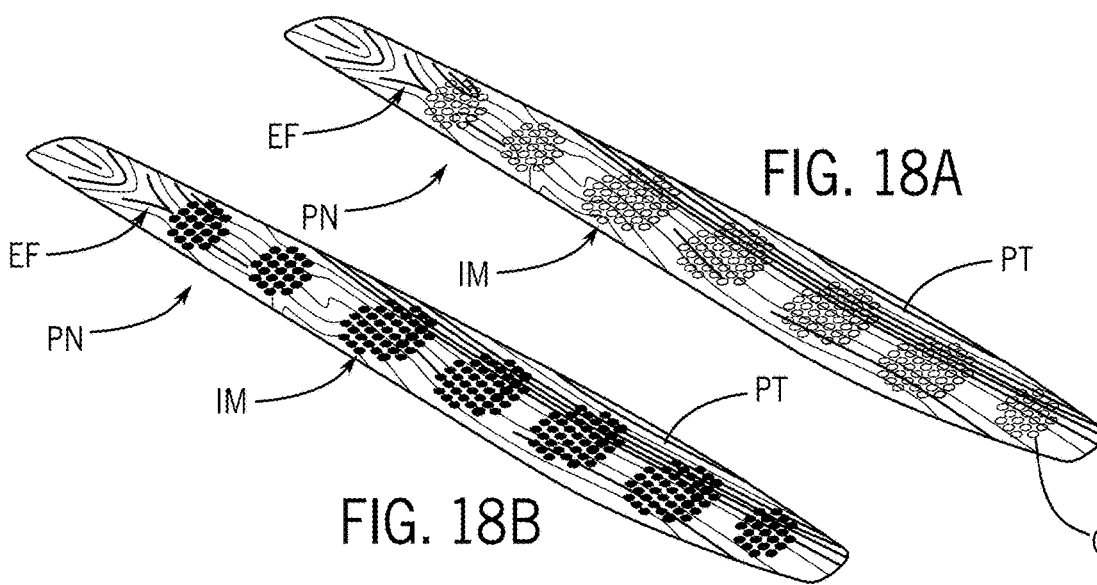
FIG. 18A is a schematic perspective view of a vehicle interior component according to an exemplary embodiment.
Figure 18B:
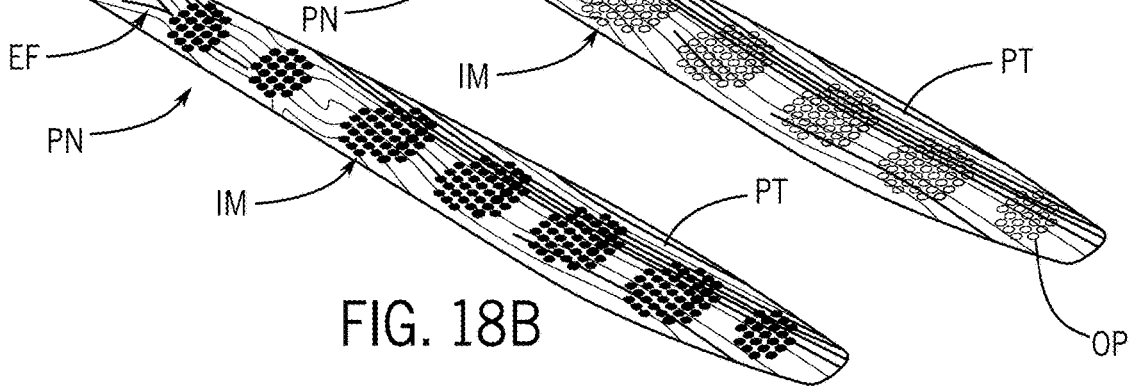
FIG. 18B is a schematic perspective view of a vehicle interior component according to an exemplary embodiment.
Figure 22A:
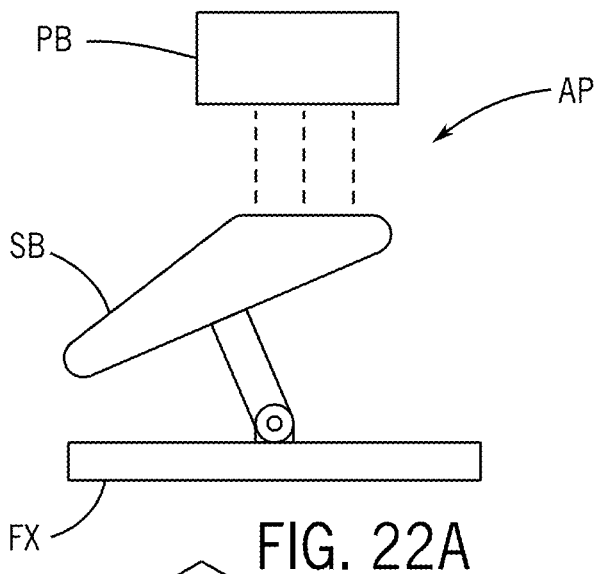
FIGS. 22A to 22B are schematic section views of a method to produce a vehicle interior component according to an exemplary embodiment.
Figure 22B:
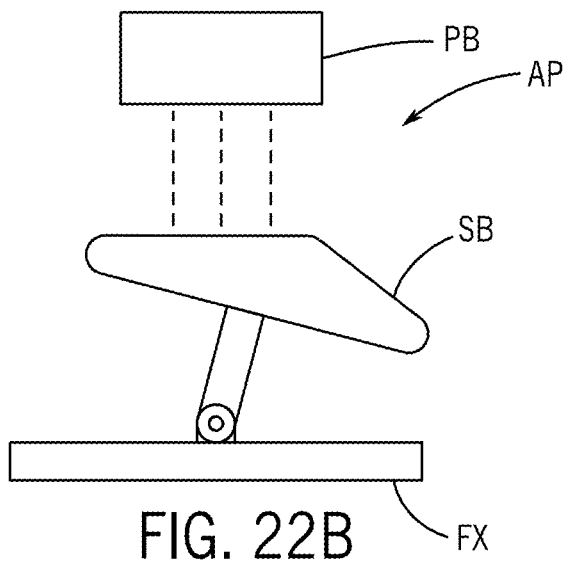
Figure 22C:
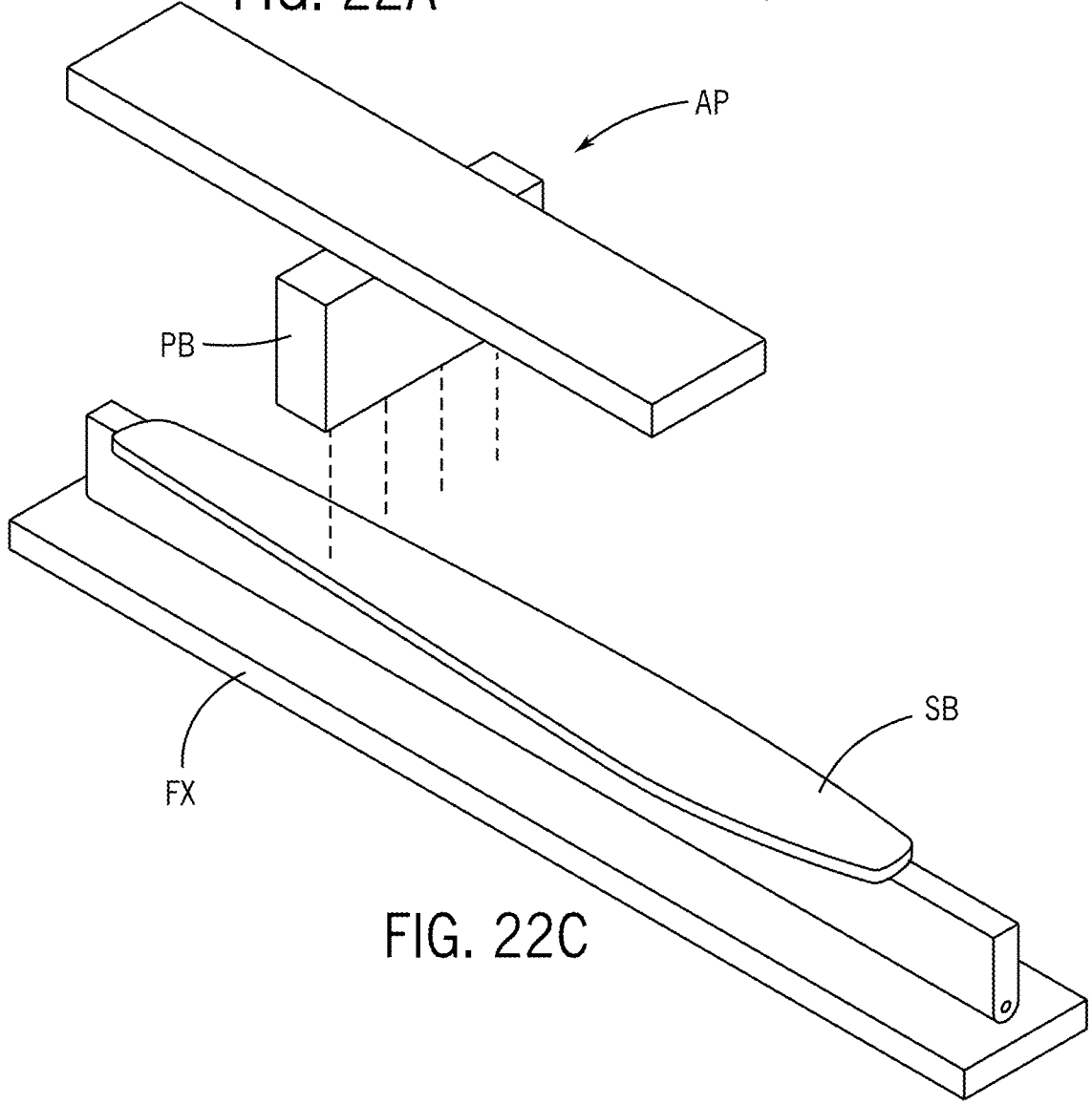
FIG. 22C is a schematic perspective view of a method to produce a vehicle interior component according to an exemplary embodiment.
Figure 23A:
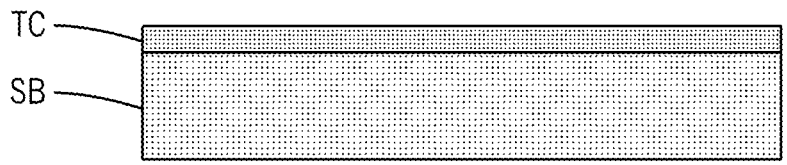
FIGS. 23A to 23F are schematic partial section views of a vehicle interior component according to an exemplary embodiment.
Figure 23B:
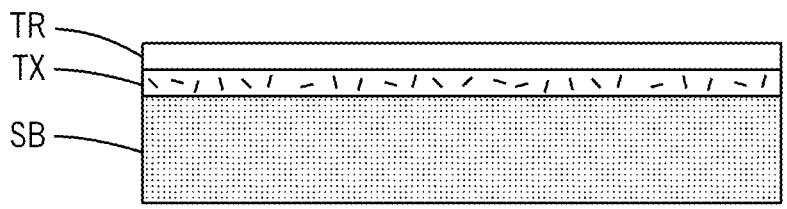
Figure 23C:
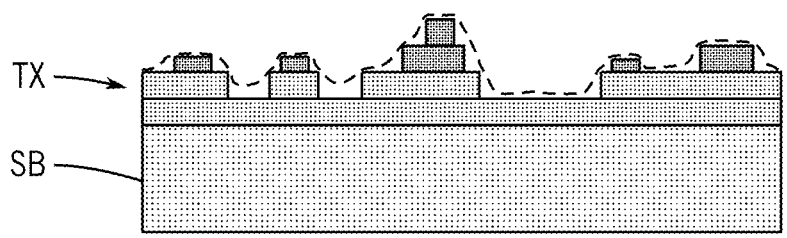
Figure 23D:
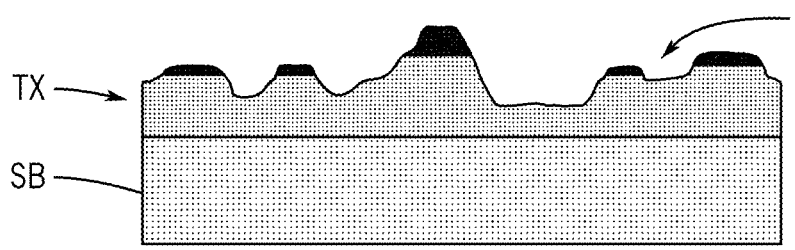
Figure 23E:
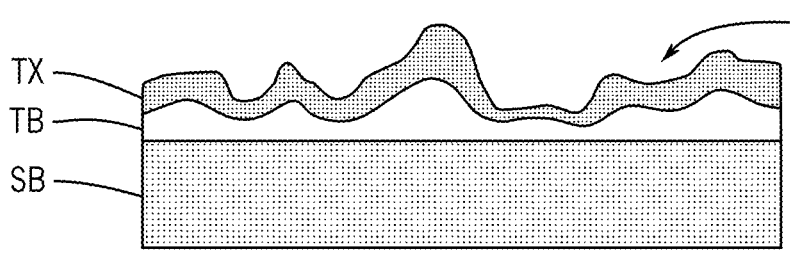
Figure 23F:
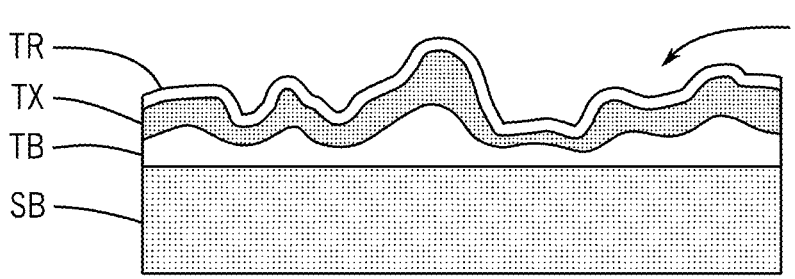
Figure 24A:
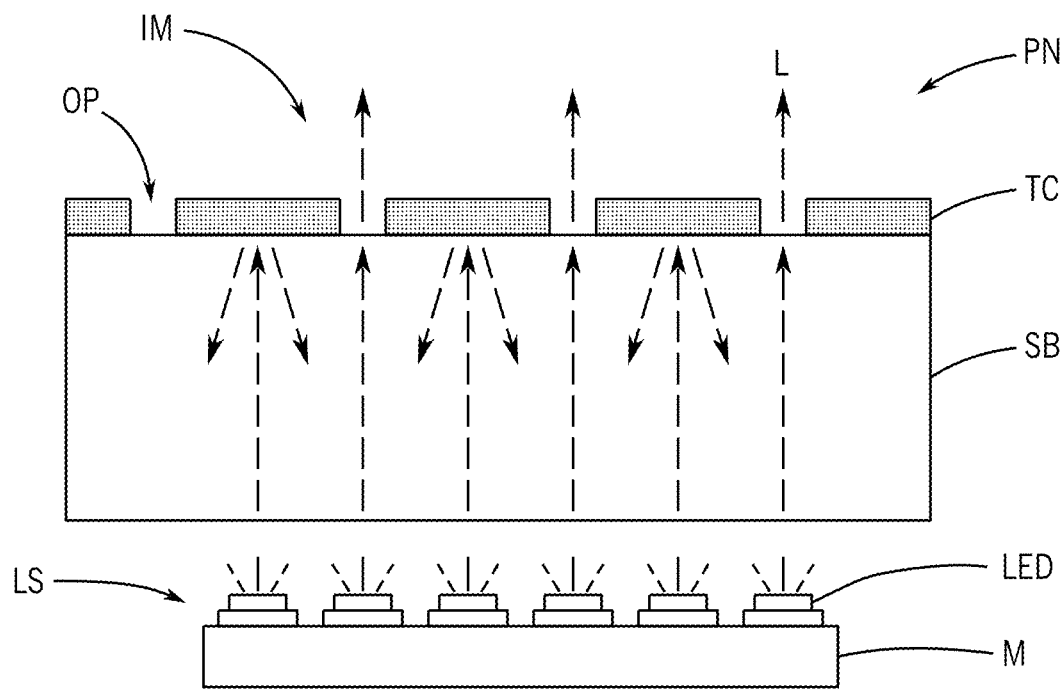
FIGS. 24A to 24D are schematic section views of vehicle interior components according to an exemplary embodiment.
Figure 24B:
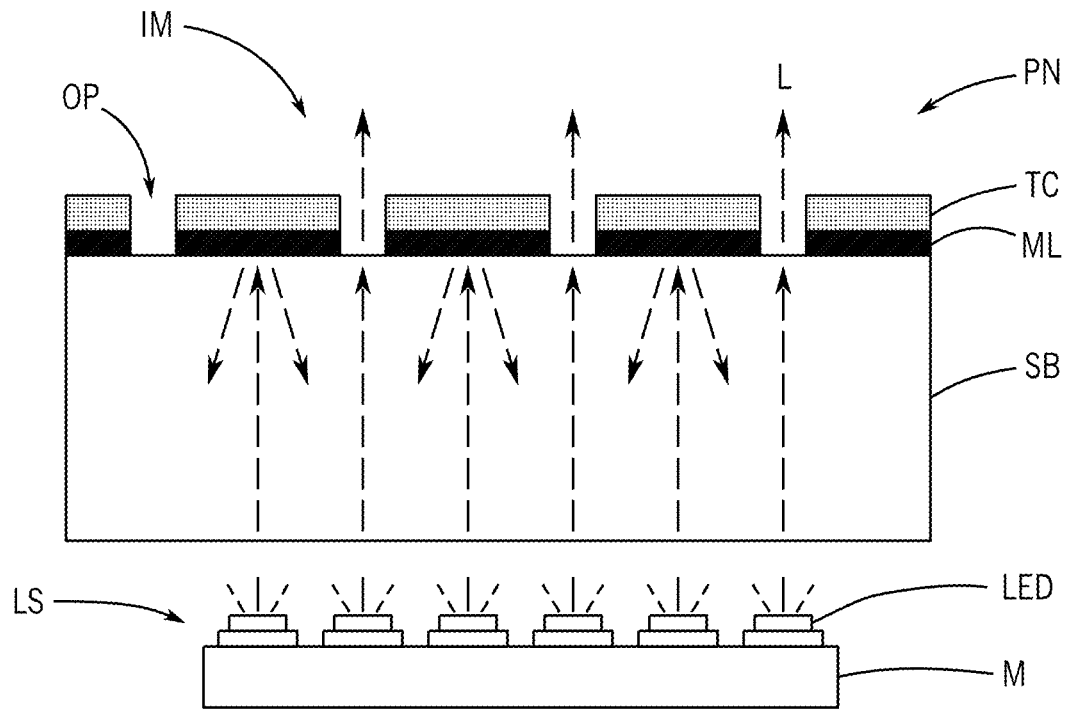
Figure 24C:
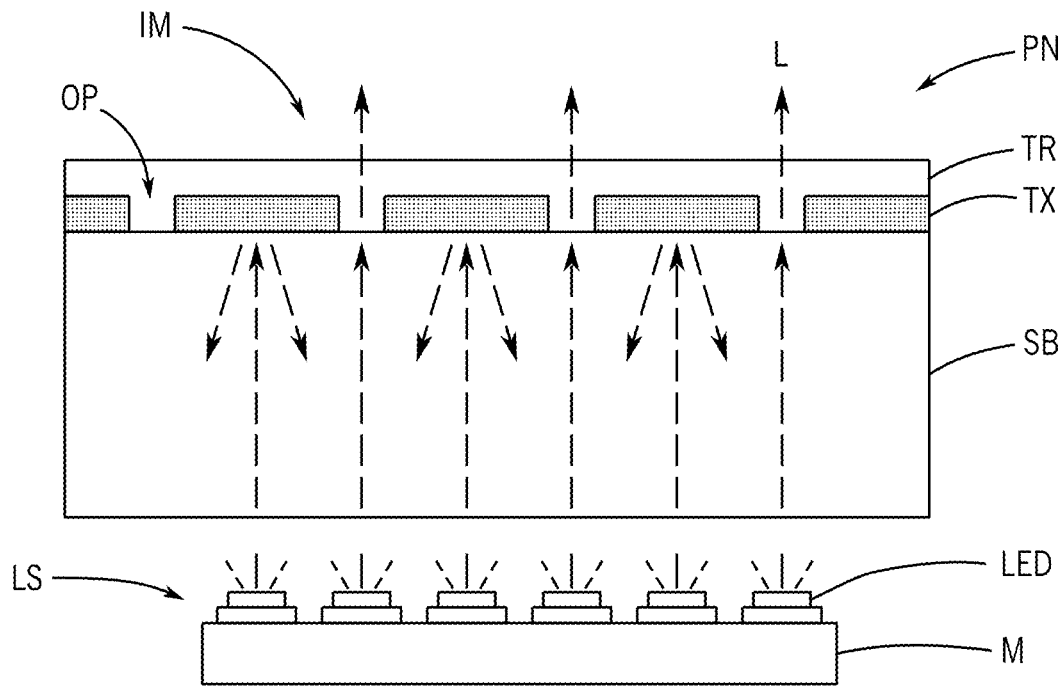
Figure 24D:
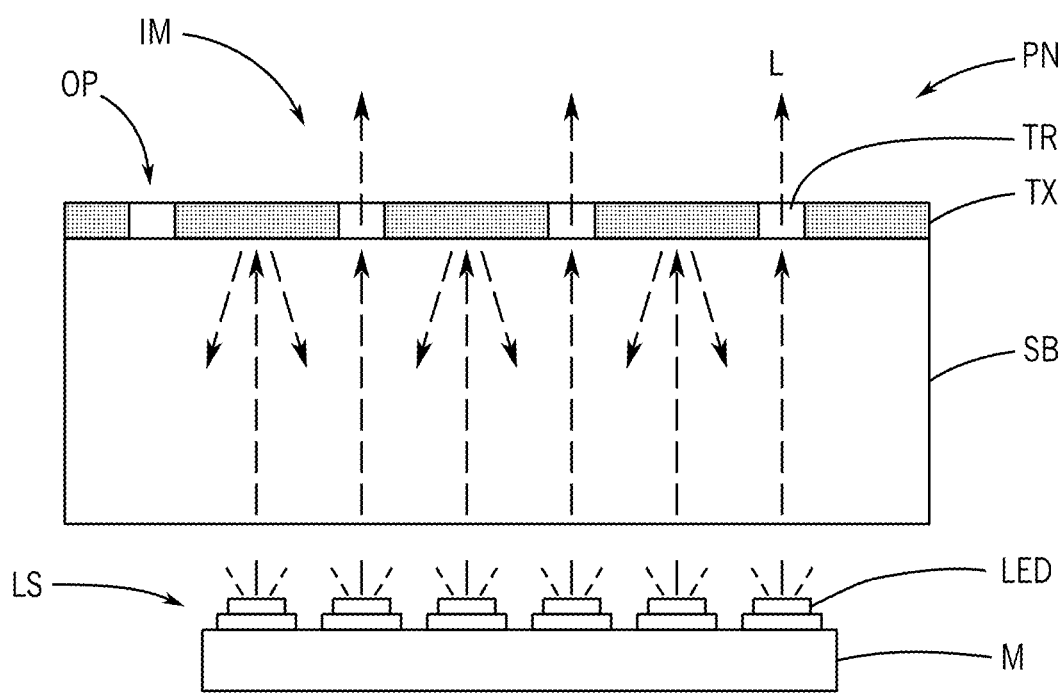
Figure 25A:
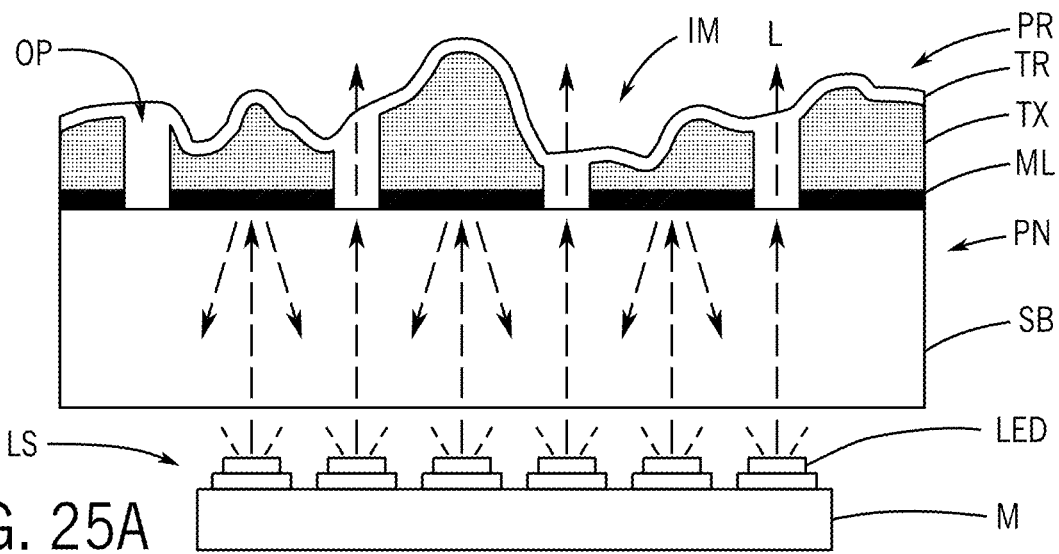
FIGS. 25A to 25C are schematic section views of vehicle interior components according to an exemplary embodiment.
Figure 25B:
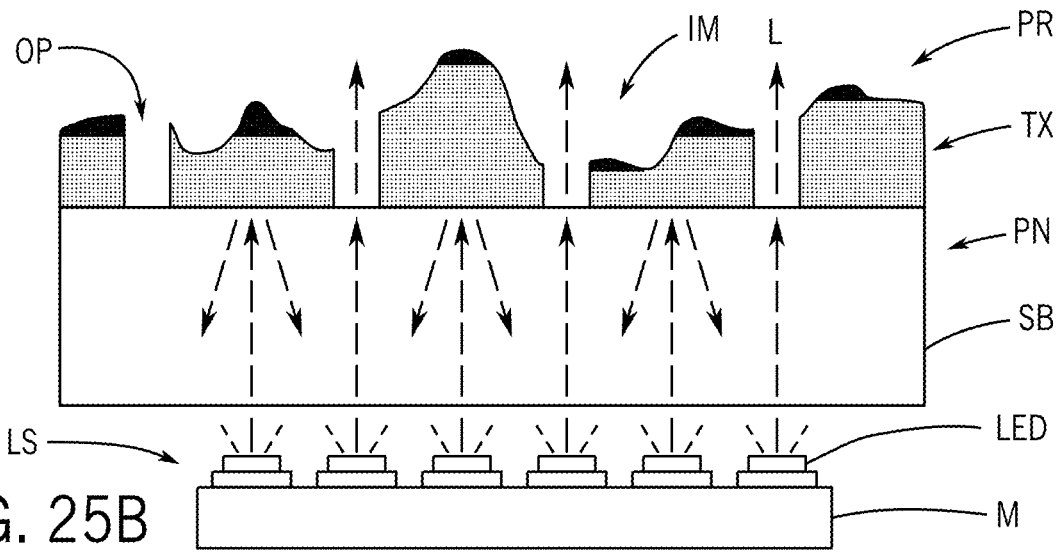
Figure 25C:
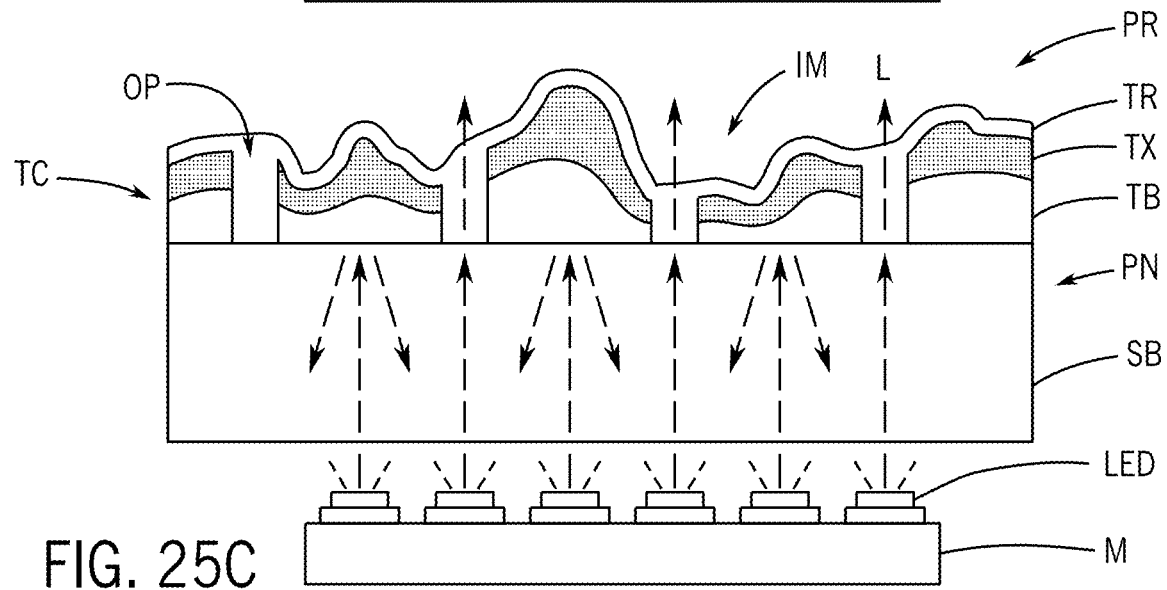

According to an exemplary embodiment shown in FIGS. 2A-2B and 3A-3L, component C may comprise a panel shown as trim panel PN; trim panel PN may comprise a substrate SB with a cover TC configured to present an effect EF shown as a visual effect and/or surface effect such as with a pattern PT and/or a profile PR. See also FIGS. 23A-23F, 28A-28E, 29A-29B, 30 and 31. As indicated schematically in FIGS. 2B, 3A-3L, 15A-15J, 16A-16E, 17 and 18A-18B, panel/component PN/C may be configured to present a user interface UI provided by a module M (e.g. with illumination from a light source, illumination from a light source through voids/openings, image display, sensor/detector or switch, haptics, etc.); as indicated schematically, effect EF may comprise a visual effect provided as an illumination effect such as an image/image display IM (e.g. icon, element, etc.) at cover TC of component PN/C; the module M may comprise and/or operate a light source LS with light elements shown as an LED/LED array to provide light L transmitted through substrate SB and through/to an exterior surface of cover TC as an image IM for user interface UI and/or effect EF (e.g. visual effect, illumination effect, etc.). See also FIGS. 19A-19D, 20A-20B, 21A-21B, 24A-24D and 25A-25C. As indicated schematically in FIGS. 1B and 2A, component C may comprise a panel/insert and/or assembled component configured for use in vehicle interior I.

According to an exemplary embodiment as shown schematically in FIGS. 2A-2B and 3A-3L, component PN may provide a cover TC comprising a cover layer TX and configured to present effect EF such as with a visual effect (e.g. pattern, color, shading, multi-color, voids, discontinuities, topography, etc.) and/or a surface effect with a profile/relief PR (e.g. pattern, texture, grain, gradient, voids, discontinuities, topography, etc.). See also FIGS. 15A-15J, 16A-16E, 17, 18A-18B, 19A-19D, 20A-20B, 21A-21B, 23A-23F, 28A-28E, 29A-29B, 30 and 31. As indicated schematically in FIGS. 3A-3D and 3G-3L, effect EF provided at cover TC of component PN may comprise a grain appearance such as a wood grain pattern. See also FIGS. 16B-16E, 18A-18B, 19A-19B, 28A-28C, 30 and 31. As indicated schematically in FIGS. 3E-3F, effect EF provided at cover TC of component PN may comprise an alternative appearance such as a design/decorative pattern. See also FIGS. 16A, 17, 19C-19D, 28D-28E and 29A-29B. As indicated schematically, effect EF and profile PR of cover TC of component PN may be provided in a wide variety of forms and arrangements.

According to an exemplary embodiment as shown schematically in FIGS. 2A-2B and 3A-3L, component PN may provide a cover TC comprising a base layer TB and cover layer TX configured to present effect EF such as with a visual effect (e.g. pattern, color, shading, multi-color, voids, discontinuities, topography, etc.) and/or a surface effect with a profile/relief PR (e.g. pattern, texture, grain, gradient, voids, discontinuities, topography, etc.). According to an exemplary embodiment as shown schematically in FIGS. 2A-2B, 3C-3F and 3I-3L, component PN may provide a cover TC comprising a base layer TB and a cover layer TX and exterior/coating layer TR configured to present effect EF such as with a visual effect (e.g. pattern, color, shading, multi-color, voids, discontinuities, topography, etc.) and/or a surface effect with a profile/relief PR (e.g. pattern, texture, grain, gradient, voids, discontinuities, topography, etc.). According to an exemplary embodiment as indicated schematically in FIGS. 2B and 3G-3L, component PN may provide a cover TC comprising a base layer TB and a cover layer TX and a set of voids/openings OP configured to present effect EF such as with a visual effect (e.g. pattern, color, shading, multi-color, voids, discontinuities, topography, etc.) and/or a surface effect with a profile/relief PR (e.g. pattern, texture, grain, gradient, voids, discontinuities, topography, etc.) and/or illumination effect (e.g. for passage/transmission of light from a light source/module) through substrate SB to an exterior surface of cover TC. See also FIGS. 15A-15J, 16C-16E, 18A-18B, 19A-19D, 20A-20B, 21A-21B, 24A-24D and 25A-25C.

According to an exemplary embodiment as shown schematically in FIGS. 4A-4B, 5A-5C, 6A-6C, 7A-7C, 9A-9D, 10A-10E, 11A-11C, 12A-12C, 13A-13D, 14A-14I, and 22A-22C, a method of producing a component such as panel PN for a vehicle interior may comprise the steps of providing a substrate SB and forming a cover TC on the substrate to provide an exterior surface configured to present an effect. See also FIGS. 26A-26B and 27A-27C. As indicated schematically in FIGS. 2A-2B, 3A-3L, 15A-15J, 16A-16E, 17, 18A-18B, 19A-19D, 20A-20B, 21A-21B, 23A-23F, 28A-28E, 29A-29B, 30 and 31, cover layer TX of cover TC may be configured to present effect EF such as the surface effect of cover TC.

As shown schematically in FIGS. 5A-5C, 10A-10E and 11A-11C, the step of forming cover TC on substrate SB may comprise the step of applying a material such as a plastic/resin B to form a base layer TB on substrate SB. See also FIGS. 3A-3L, 23E and 23F. As indicated schematically in FIGS. 23A, 23C and 23D, the step of forming cover TC on substrate SB may comprise the step of applying a material such as a colorant/ink X and/or resin as a cover layer TX on substrate SB. As shown schematically in FIGS. 6A-6C, 12A-12C and 13A-13D, the step of forming cover TC on substrate SB may comprise the step of applying a base layer TB on substrate SB then applying a material such as a colorant/ink X as a cover layer TX on base layer TB (e.g. an ink X such as a composite/selection of black/K, yellow/Y, magenta/M, cyan/C). See also FIGS. 3A-3L. As indicated schematically in FIGS. 9A-9D, the step of forming cover TC on substrate SB may comprise the step of applying an opaque material such as a colorant/ink X to provide a mask layer ML on substrate SB; a base layer TB may be applied on mask layer ML. See also FIGS. 3K-3L, 15I-15J, 24B and 25A. As indicated schematically in FIGS. 7A-7C and 14A-14I, the step of forming cover TC on substrate SB may comprise the step of applying a light-transmissive protective coating/material R as a coating layer TR on base layer TB and/or cover layer TX. See also FIGS. 3C-3F and 3I-3L. As indicated schematically in FIGS. 9A-9D, 10A-10E, 11A-11C and 12A-12C, the step of forming cover TC on substrate SB may comprise the step of applying a base layer TB on substrate SB then applying a cover layer TX with voids OP on base layer TB. See also FIGS. 3G-3H. As indicated schematically in FIGS. 9A-9D, 10A-10E, 11A-11C, 12A-12C, 13A-13A and 14A-14I, the step of forming cover TC on substrate SB may comprise the step of applying a base layer TB on substrate SB then applying a cover layer TX with voids OP on base layer TB and then applying a coating layer TR on base layer TB and/or cover layer TX. See also FIGS. 3I-3K. As indicated schematically in FIGS. 3C-3F, 3I-3L and 14A-14I, coating layer TR may be provided in a variety of arrangements/forms; coating layer TR may cover cover layer TX (see FIGS. 3C-3F, 14F-14G); coating layer TR may encapsulate/cover the entire surface of cover TC (see FIGS. 3C-3F, 3I-3L, 14B-14E, 14H-14I); coating layer TR may cover cover layer TX and fully and/or partially fill voids OP in cover TC (see FIGS. 3I-3L, 14B-14E and 14H-14I).

As indicated schematically in FIGS. 2A-2B, 3A-3L, 15A-15J, 16A-16E, 17, 18A-18B, 19A-19D, 20A-20B, 21A-21B, 23A-23F, 28A-28E, 29A-29B, 30 and 31, effect EF such as visual effect and profile PR such as surface effect of cover TC of component C/PN may be provided by each/any of base layer TB (if any) and/or cover layer TX and/or coating layer TR (if any). As indicated schematically in FIGS. 2A-2B and 3A-3L, cover TC may comprise a base layer TB and a cover layer TX configured to present effect EF such as a surface effect; base layer TB of cover TC may be formed on substrate SB; cover layer TX of cover TC may be formed on base layer TB of cover TC; an exterior layer such as a coating TR may be formed on cover layer TX of cover TC; coating TR may provide an exterior surface on cover layer TX of cover TC. See FIGS. 5A-5C, 6A-6C and 7A-7C. Cover layer TX may be configured to present the effect such as the visual effect and/or surface effect of the cover. See also FIGS. 2A-2B, 30 and 31.

As indicated schematically in FIGS. 2B, 3G-3L, 15A-15J, 16C-16E, 18A-18B, 19A-19D, 20A-20B, 21A-21B, 24A-24D and 25A-25C, substrate SB may be at least partially light-transmissive (e.g. of a light-transmissive material and/or with voids, etc.); cover TC may be at least partially light-transmissive (e.g. with voids for light transmission). Cover TC may be configured to present an effect comprising a visual effect and/or a surface effect on the exterior surface; the visual effect may comprise an illumination effect when illuminated by light from a light source. See also FIGS. 2B, 3G-3L, 15A-15J, 16C-16E, 18A-18B, 19A-19D, 20A-20B, 21A-21B, 24A-24D and 25A-25C.

According to an exemplary embodiment as shown schematically in FIGS. 10A-10E, 11A-11C, 12A-12C, 13A-13D and 14A-14I, the step of forming cover TC on substrate SB may comprise the step of applying a base layer TB with voids OP on substrate SB then applying a cover layer TX with voids OP on base layer TB; a coating layer TR may be filled in the voids OP (e.g. fully and/or partially); voids of base layer TB and voids of cover layer TX and/or coating layer TX may be configured to provide an effect such as the illumination effect of the cover. See also FIGS. 2B, 3G-3L, 15A-15J, 16C-16E, 18A-18B, 19A-19D, 20A-20B, 21A-21B, 24A-24D and 25A-25C.

Figure 27A:
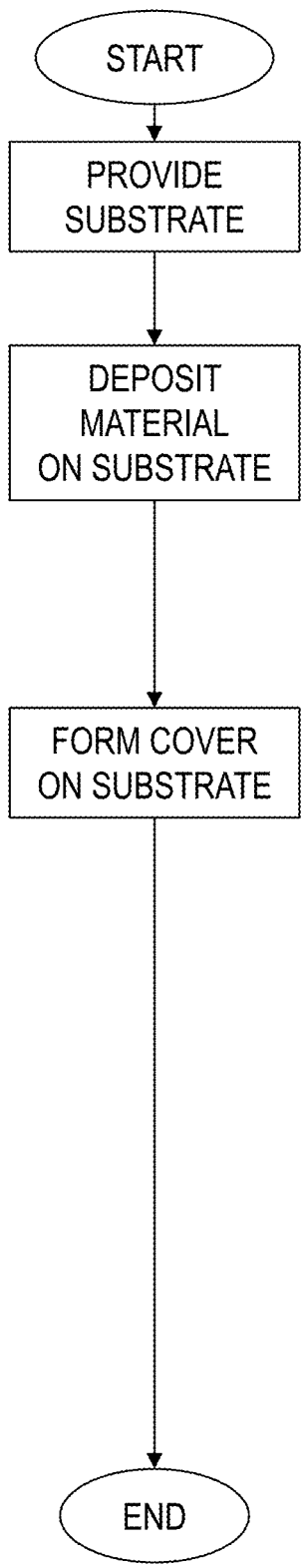
FIGS. 27A to 27C are schematic flow diagrams of methods to produce a vehicle interior component according to an exemplary embodiment.
Figure 27B:
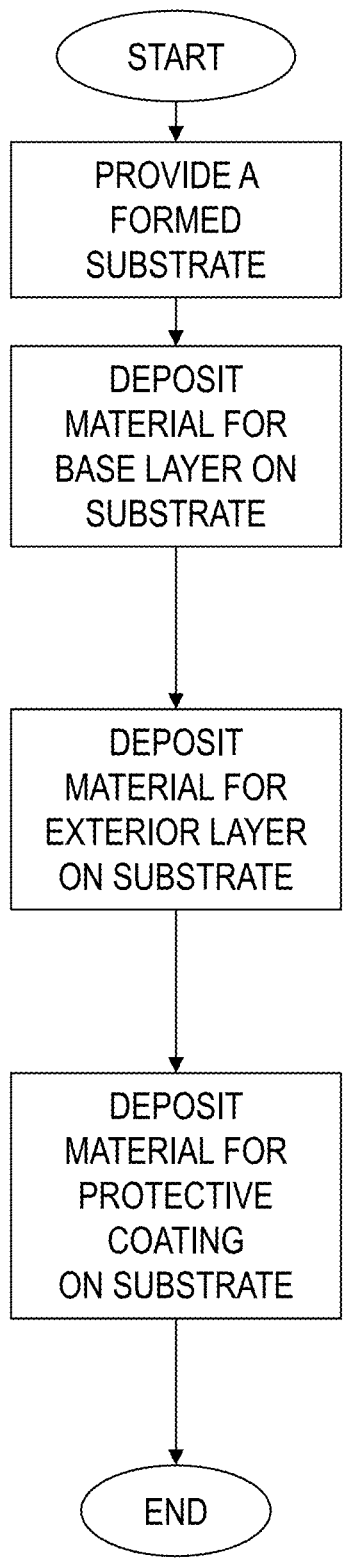
Figure 27C:
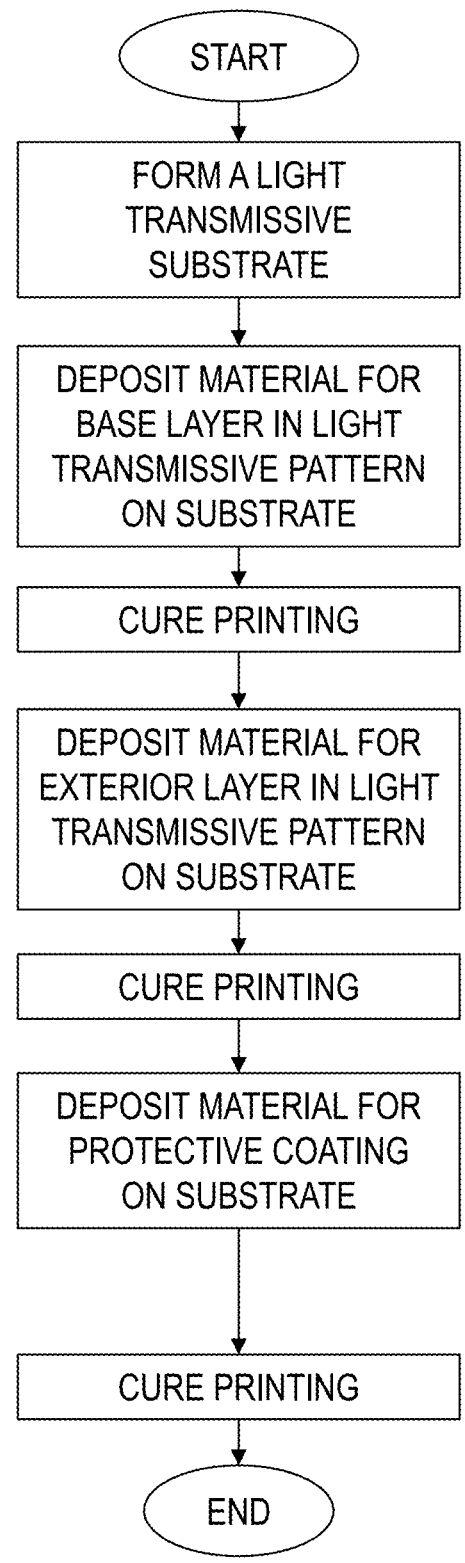
Figure 28A:
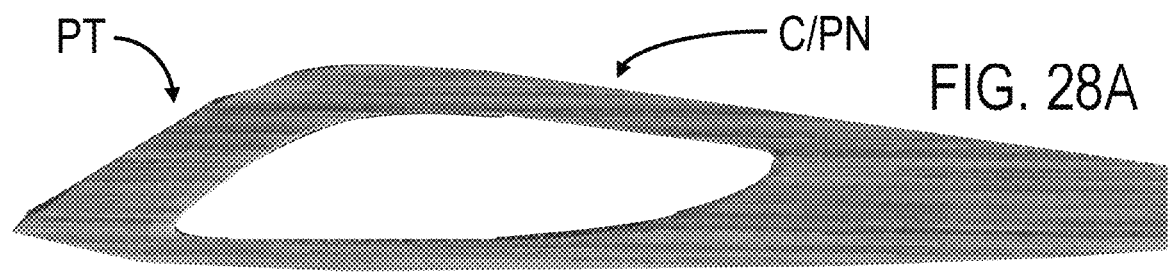
FIGS. 28A to 28E are schematic partial plan views of vehicle interior components according to an exemplary embodiment.
Figure 28B:
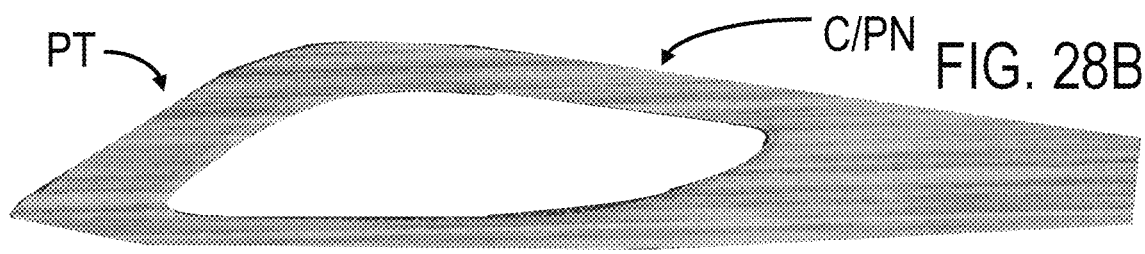
Figure 28C:
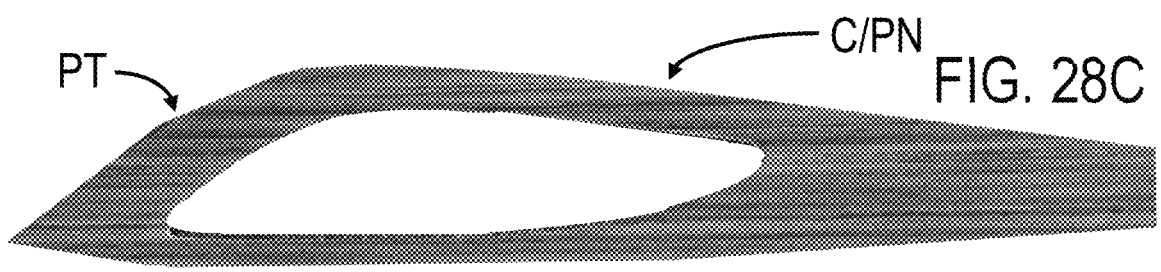
Figure 28D:
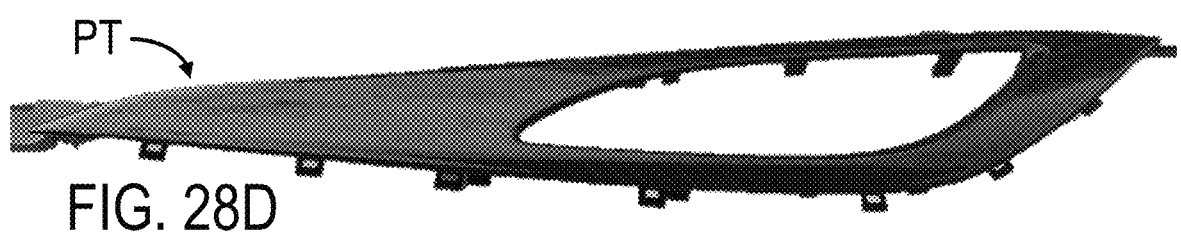
Figure 28E:
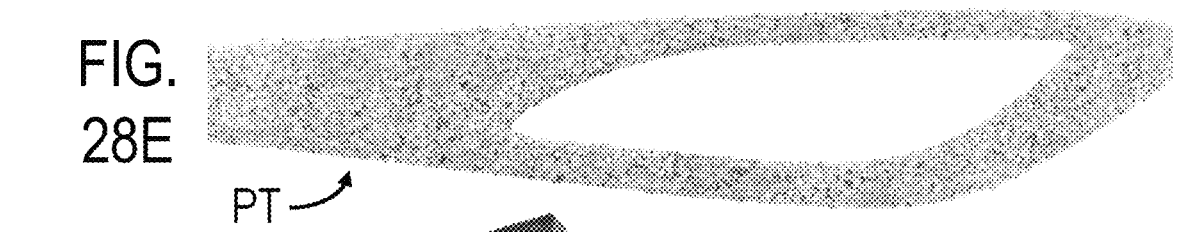
Figure 29A:
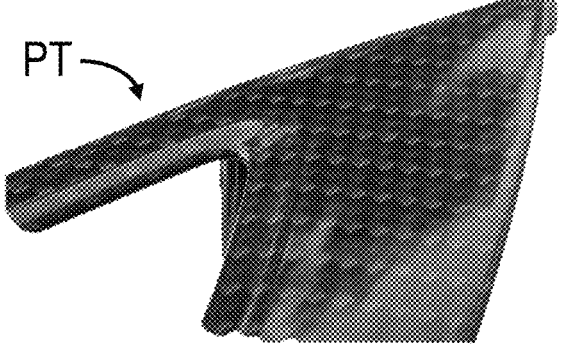
FIGS. 29A to 29B are schematic partial perspective views of vehicle interior components according to an exemplary embodiment.
Figure 29B:
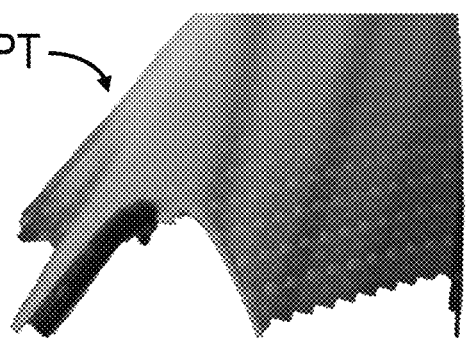
Figure 30:
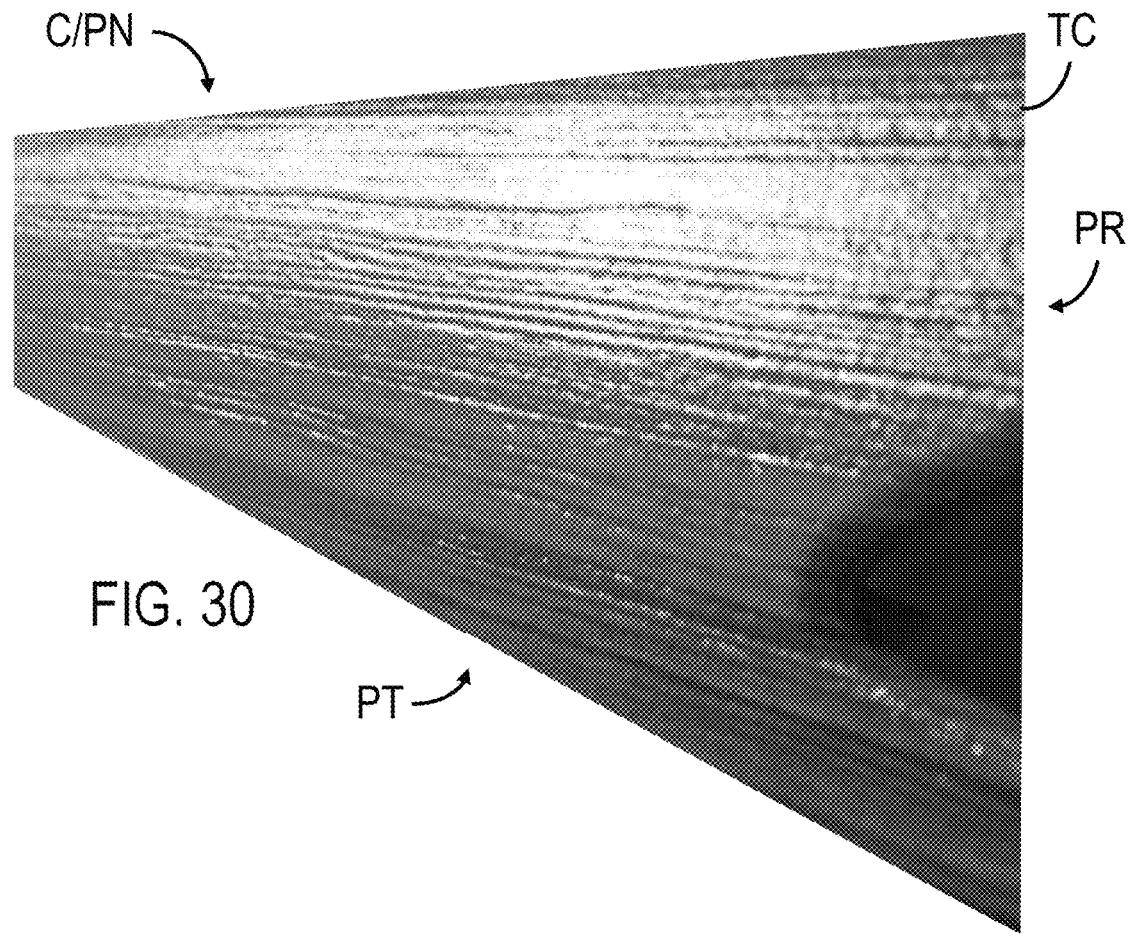
FIG. 30 is a schematic partial perspective view of a vehicle interior component according to an exemplary embodiment.
Figure 31:
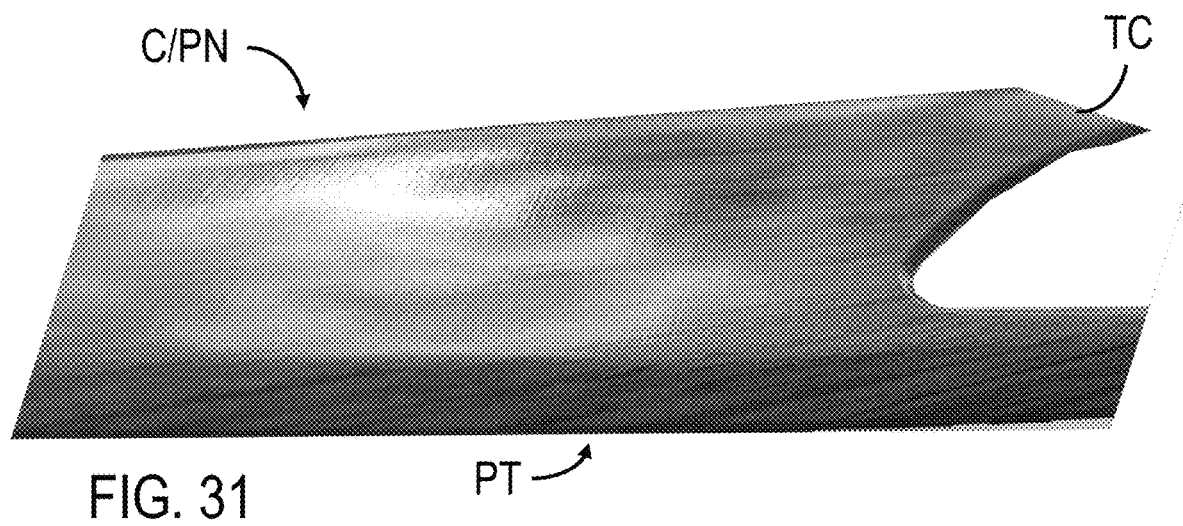
FIG. 31 is a schematic partial perspective view of a vehicle interior component according to an exemplary embodiment.

According to an exemplary embodiment indicated schematically in FIG. 27C, the method may comprise the step of curing material of the cover using at least one of ultraviolet (UV) light, UV-A light, UV-B light, UV-C light, light in a wavelength created by UV-LED, light in a wavelength created by UV-Mercury lamp, by hot air; in an oven; by infrared (IR) radiation; by near infrared (NIR) radiation.

According to an exemplary embodiment indicated schematically in FIGS. 3G-3L, 15A-15J, 16C-16E, 18A-18B, 19A-19D, 20A-20B, 21A-21B, 24A-24D and 25A-25C, a component PN for a vehicle interior configured to be illuminated by light L from a light source LS may comprise a substrate SB and a cover TC formed on the substrate SB and comprising an exterior surface; the substrate may be at least partially light-transmissive; the cover may be at least partially light-transmissive. The cover may be configured to present an effect comprising a visual effect and/or a surface effect on the exterior surface; the visual effect may comprise an illumination effect when illuminated by light from the light source. The cover may comprise a base layer and a cover layer configured to present the effect. The base layer of the cover may be formed on the substrate; the cover layer of the cover may be formed on the base layer of the cover; a coating may be formed on the cover layer of the cover; the coating may provide the exterior surface on the cover layer of the cover. The cover layer may be configured to present the surface effect of the cover. The cover layer may be configured to present the visual effect of the cover; a coating may provide the exterior surface on the cover layer of the cover and the cover layer may be configured to present the surface effect through the coating of the cover; the coating may provide the exterior surface on the cover layer of the cover and the cover layer may be configured to present the surface effect comprising a texture through the coating of the cover; the coating may provide the exterior surface on the cover layer of the cover and the cover layer may be configured to present the visual effect through the coating of the cover.

According to an exemplary embodiment indicated schematically in FIGS. 3G-3L, 15A-15J, 16C-16E, 18A-18B, 20B, 24A-24D and 25A-25C, the cover layer TX of cover TC may comprise a set of light-transmissive sections shown as voids/holes OP in cover layer TX; light-transmissive sections of cover layer TX may be configured to provide the illumination effect of the cover; the light-transmissive sections may comprise voids in the cover layer; the light-transmissive sections may comprise holes in the cover layer; the light-transmissive sections may comprise openings in the cover layer; the cover layer may be at least partially light transmissive; the base layer of the cover may be at least partially light transmissive; the base layer of the cover may comprise a light-transmissive material; the base layer of the cover may comprise a set of light transmissive sections; the light-transmissive sections of the base layer may be configured to provide the illumination effect of the cover; the light-transmissive sections of the cover layer may align with the light-transmissive sections of the base layer; the light-transmissive sections of the cover layer and the light-transmissive sections of the base layer may be configured to present the illumination effect of the cover. The cover may comprise the base layer and the cover layer and a coating; the coating may comprise a light-transmissive coating.

According to an exemplary embodiment indicated schematically in FIGS. 2A-2B, 3A-3L, 15A-15J, 16A-16E, 17, 18A-18B, 19A-19D, 20A-20B, 21A-21B, 28A-28E, 29A-29B, 30 and 31, effect EF of the cover may comprise a visual effect comprising a pattern PT of base layer TB and/or cover layer TX of the cover.

According to an exemplary embodiment indicated schematically in FIGS. 4A-4B, 5A-5C, 6A-6C, 7A-7C, 9A-9D, 10A-10E, 11A-11C, 12A-12C, 13A-13D, 14A-14I, 22A-22C, 26A-26B and 27A-27C, base layer TB of the cover may comprise a deposited material B formed on the substrate; the deposited material of the base layer of the cover may comprise a resin; the deposited material of the base layer of the cover may comprise a form on the substrate. According to an exemplary embodiment indicated schematically in FIGS. 3A-3B, 3G-3H, 5A-5C, 6A-6C, 10A-10E, 11A-11C, 12A-12C, 13A-13D and 23C-23E, cover layer TX may comprise a coating on the form of base layer TB on substrate SB; the form may be configured to present the surface effect. The cover layer may comprise a coating; the cover layer may comprise an ink; the cover layer may comprise a formed material on the substrate; the cover layer may comprise a formed material on the base layer of the cover; the formed material may comprise a color and/or shading. See FIGS. 2B, 16A-16E, 17, 18A-18B, 19A-19D, 20A-20B, 21A-21B, 23A-23F, 28A-28E, 29A-29B, 30 and 31. The color may comprise at least one of (a) black and/or (b) yellow and/or (c) magenta and/or (d) cyan. See FIGS. 4A-4B. The color may comprise at least one of (a) black and/or (b) yellow and/or (c) magenta and/or (d) cyan and/or (e) white and/or (f) metallic color. The cover layer may comprise an ink applied on the base layer of the cover; the cover layer may comprise multiple inks/colors. See FIGS. 6A-6C, 12A-12C, 13A-13D, 23A-23F, 25B and 28A-28E. The substrate may comprise a material; the material of the substrate may comprise of at least one of resin, plastic, plastic resin, thermoplastic resin, thermoset resin, metal, alloy, aluminum, natural fiber, wood, bamboo. The base layer may comprise a material; the material of the base layer may comprise at least one of plastic, resin, polyurethane resin, polyacrylic resin, polymethacrylic resin, polyepoxide resin, pigments, solvents, dyes, flakes, monomers, additives, fillers, photoinitiators. The cover layer may comprise a material; the material of the cover layer may comprise at least one of plastic, ink, resin, polyurethane resin, polyacrylic resin, polymethacrylic resin, polyepoxide resin, pigments, solvents, dyes, flakes, monomers, additives, fillers, photo-initiators. The cover may comprise a coating; the coating may comprise at least one of plastic, resin, optically clear material, coating, film layer.

According to an exemplary embodiment indicated schematically in FIGS. 3C-3F, 3I-3L, 7A-7C, 14A-14I, 23B and 23F, the component may comprise a coating layer TR formed on the cover layer TX. The coating may comprise a clear coating. The coating may comprise the exterior surface of the cover. The cover layer may comprise a set of holes; a coating may be applied on the cover layer and in the set of holes of the cover layer. The cover layer may be configured to present the illumination effect of the cover through a set of holes in the cover layer; a coating may provide the exterior surface on the cover layer of the cover and the cover layer may be configured to present the surface effect through the coating of the cover. The visual effect of the cover may comprise the illumination effect through the set of holes in the cover layer and the surface effect through a coating on the cover layer of the cover.

According to an exemplary embodiment indicated schematically in FIGS. 2A-2B, 3A, 14A-14I, 16A-16B, 17, 23C-23F, 25A-25C, 28A-28E, 29A-29B, 30 and 31, effect EF shown as a surface effect on the exterior surface of the cover may be presented by a pattern PT of the cover layer TX of cover TC; the pattern may comprise a wood grain effect; the pattern may comprise a color effect; the pattern may comprise a relief; the pattern may comprise a relief; the relief may comprise at least one of contour, profile, texture, haptic surface, sculptural design, plastic formation; the pattern may comprise a texture; the pattern may comprise a profile; the pattern may comprise a printed pattern. See FIGS. 26A-26B and 27A-27C. According to an exemplary embodiment indicated schematically in FIGS. 2A-2B, 3A, 23C-23F, 25A-25C, the surface effect on the exterior surface of the cover may be presented by a form on the base layer; the form on the base layer may comprise a profile; the surface effect on the exterior surface of the cover may be presented by a form on the base layer of the cover and a pattern on the cover layer of the cover. According to an exemplary embodiment indicated schematically in FIGS. 27A-27C, the component may be formed by a process comprising the steps of applying the base layer to the substrate then applying the cover layer to the substrate; the cover layer may be applied on the base layer. According to an exemplary embodiment indicated schematically in FIGS. 22A-22C, component PN may be produced by a method/process in an apparatus AP configured to deposit material for cover TC on substrate SB and may comprise the step of securing substrate SB in a fixture FX; substrate SB may be rotated in fixture FX of apparatus AP so that cover layer TC can be applied by deposit of material from an outlet shown as print head/bar PB. See also FIGS. 4A-4B, 5A-5C, 6A-6C and 7A-7C. According to an exemplary embodiment indicated schematically in FIGS. 4A-4B, 5A-5C, 6A-6C, 7A-7C and 27A-27C, component C/PN may be formed by a process comprising the steps of applying base layer TB to substrate SB then applying cover layer TX then applying coating layer TR.

According to an exemplary embodiment, the coating may comprise a functional coating. The coating may comprise a protective coating in the cover. The coating may comprise a finish for the exterior surface of the cover. The coating may comprise at least one of a (a) gloss finish; (b) matte finish; (c) surface texture; (d) surface finish; (e) smooth finish; (f) rough finish; (g) protective layer; (h) chemical-resistive layer; (i) scratch-resistant layer; (j) sun-light exposure protective layer; (k) corrosion resistant layer.

According to an exemplary embodiment, the visual effect of the cover may comprise a multi-color effect; the multi-color effect may comprise a grain pattern; the multi-color effect may comprise a grain pattern with a texture; the visual effect may comprise a grain pattern with texture providing the surface effect; the surface effect may comprise a texture effect; the texture effect may comprise a smooth texture over the grain pattern. See FIGS. 2A-2B, 3A-3L, 15A-15J, 16A-16E, 17, 18A-18B, 19A-19D, 20A-20B, 21A-21B, 23A-23F, 25A-25C, 28A-28E, 29A-29B, 30 and 31.

According to an exemplary embodiment shown in FIGS. 15A-15J and 17, component PN may comprise a module M comprising light source LS. The component may be configured to present a user interface at the exterior surface of the cover; the user interface may comprise the visual effect.

See FIGS. 2A-2B, 20A-20B and 21A-21B. The component may comprise a module comprising the light source configured to present the user interface; the user interface may comprise the illumination effect; the illumination effect may comprise an illuminated image; the illuminated image may comprise a set of icons. See FIGS. 15A-15J, 16C-16E, 17, 18A-18B, 19A-19D, 20A-20B and 21A-21B.

As indicated schematically in FIGS. 26A-26B, the component may be produced with a computer-controlled system/process comprising data for the pattern and/or profile for the cover and with monitoring/control of material to be applied by deposit on the substrate by the apparatus to form the cover according to a design/data set. As indicated schematically in FIGS. 27A-27C, the component may be produced by a method/process with a cover formed by deposit of material on the substrate; the process may comprise application of a protective coating for the cover; the process may comprise curing/setting of the deposited material of the cover on the substrate. The deposit of material to form the cover on the substrate to form a pattern and/or profile may comprise multiple steps and/or use of an apparatus comprising a device to deposit material (such as a print bar) and a fixture (e.g. apparatus operated by a control system). See FIGS. 4A-4B, 5A-5C, 6A-6C, 7A-7C, 9A-9D, 10A-10E, 11A-11C, 12A-12C, 13A-13D, 14A-14I, 22A-22C, 26A-26B and 27A-27C.

According to an exemplary embodiment as shown schematically in FIGS. 2A-2B, 3A-3L, 15A-15J, 16A-16E, 17, 18A-18B, 19A-19D, 20A-20B, 21A-21B, 23C-23F, 25A-25C, 28A-28E, 29A-29B, 30 and 31, the component may comprise a cover with an effect such as a visual effect and/or a surface effect. According to an exemplary embodiment as shown schematically in FIGS. 2A-2B, 3A-3L, 15A-15J, 16A-16E, 17, 18A-18B, 19A-19D, 20A-20B, 21A-21B, 28A-28E, 29A-29B, 30 and 31, the effect may comprise a visual effect providing such as a pattern with decorative appearance (e.g. grain, design, etc.). According to an exemplary embodiment as shown schematically in FIGS. 3A, 23C-23F, 25A-25C, 28A-28E, 29A-29B, 30 and 31, the effect may comprise a surface effect providing a relief/profile (e.g. texture, etc.). According to an exemplary embodiment as shown in FIGS. 3G-3L, 15A-15J, 16C-16E, 18A-18B, 19A-19D, 20A-20B, 21A-21B, 24A-24D and 25A-25C, the effect may comprise a visual effect comprising an illumination effect (e.g. for a user interface).

Exemplary Embodiments

As indicated schematically in the FIGURES, a vehicle interior component C/PN may comprise a substrate SB and a cover TC providing an effect EF such as a surface effect and/or visual effect from a pattern PT and/or profile/relief PR. Component PN may comprise a user interface UI with a module M configured to provide an interactive region (e.g. image/icons for interaction with a vehicle occupant). The component may comprise a cover TC with a set of voids/openings OP; the openings may be filled with a light-transmissive filling such as a coating layer TR. A carrier/base shown as substrate SB may be generally light-transmissive (e.g. translucent, transparent, light-transmitting plastic, resin, etc.); light L from a light source LS and/or module M may pass through substrate SB and openings OP to provide illumination through cover TC (e.g. presentation of an image, icon, etc. at the surface of the cover); the voids/openings may have a variety of sizes/shapes and format/density and arrangement and may be small so as not to be readily perceptible at the surface of the cover when not illuminated by light from the light source. The component may comprise a functional coating TR over cover layer TX; the coating may comprise a functional coating such as at least one of gloss; matte finish; chemical resistance; surface texture; surface roughness, etc. Pattern PT in cover TC may comprise relief/profile R. Cover TC may be formed on the substrate by deposit of material such as by additive manufacture, three-dimensional printing, etc. An apparatus AP such as an additive manufacturing device/ink jet printer may deposit material B and/or X and/or R on substrate SB to provide cover TC with pattern PT and/or profile PR. As indicated schematically, the substrate may have a shape/form and contour including curvature, etc.; deposited material for the cover as applied may be conformed with the shape/form of the substrate to provide the intended final form/structure of the component (e.g. with variations in the type, form, amount, color, layering, arrangement, openings/holes, etc. for deposited material). See FIGS. 2A-2B, 3A-3L, 4B and 22A-22C.

As indicated schematically according to an exemplary embodiment in FIGS. 4A-4B, 5A-5C, 6A-6C, 7A-7C, 9A-9D, 10A-10E, 11A-11C, 12A-12C, 13A-13D, 14A-14I, 22A-22C, 26A-26B and 27A-27C, a method of producing the component with cover with design/dimension with an apparatus/fixture may comprise the use of multiple materials deposited on the substrate to form the cover such as a plastic/resin material B for the base layer and/or an ink/colorant/composite material X for the cover layer and/or a protective coating light-transmissive material R for the coating/exterior layer to produce the effect such as the visual effect (e.g. pattern, color, etc.) and/or the surface effect (e.g. profile, etc.). See also FIGS. 2A-2B, 3A-3L, 15A-15J, 16A-16E, 17, 18A-18B, 19A-19D, 20A-20B, 21A-21B, 25A-25C, 28A-28E, 29A-29B, 30 and 31. The method may comprise use of sensors/cameras/scanner (e.g. optical detection, laser measurement, etc.) to detect and monitor shape/dimension and variations with intent to ensure proper application of the deposited material (or materials) for cover on the substrate (e.g. in proper placement within intended tolerance for the material, with proper density, with proper amount, with proper speed, with possible layering, compensating for shape variations and distortion, etc.); as indicated schematically, deposited material for the cover applied by the apparatus may flow into a form providing a pattern and/or profile after being applied to the substrate (e.g. a curved/flow form, visible lines, grain effect, contour, relief, shape variations, color variations, distortions, etc.). See FIGS. 3A-3L, 23A-23F.25A-25C, 28A-28E, 29A-29B, 30 and 31. The cover including the base material and/or the cover material and/or the coating material may be provided in a variety of patterns, profiles, etc.; the base layer and/or cover layer and/or coating layer and/or voids may be formed in a variety of patterns, profiles, etc. to provide an effect at the surface of the cover, including such as the visual effect and surface effect. See FIGS. 2A-2B, 3A-3L, 16A-16E, 17, 18A-18B, 19A-19D, 20A-20B, 21A-21B, 23A-23F.25A-25C, 28A-28E, 29A-29B, 30 and 31.

According to an exemplary embodiment as shown schematically in FIGS. 3G-3L, 15A-15J, 16C-16E, 18A-18B, 19A-19D, 20A-20B, 21A-21B, 24A-24D and 25A-25C, a component for a vehicle interior configured to be illuminated by light L from a light source LS may comprise a substrate SB and a cover TC formed on the substrate SB and comprising an exterior surface. The substrate may be at least partially light-transmissive. The cover may be at least partially light-transmissive. As indicated schematically, openings may be provided on the cover in an arrangement configured to facilitate presentation of an image such as an icon at the surface of the cover; a module comprising a light source/display may be used provide illumination/light to present an illuminated image or icon at the surface of the cover. Illumination may be directed such as by an arrangement/pattern of light-transmissive material and/or voids; illumination may be directed/obstructed by opaque material such as deposited material and/or a mask/mask layer. Light-transmissive material and/or opaque material may be arranged for the cover to provide for the effect including the visual effect and illumination effect; light may be transmitted through a set of voids and/or through light guides as light-transmissive material; light transmissive material may comprise transparent material, clear material, translucent, color/shaded material, other light-transmitting material, etc. The cover may be configured to present an effect comprising a visual effect and/or a surface effect on the exterior surface. The visual effect may comprise an illumination effect when illuminated by light from the light source. The cover may comprise a base layer and/or a cover layer configured to present the effect; the effect may comprise a visual effect such as a pattern, design, color, shading, variations, grain, surface, lines, etc.; the effect may comprise a surface effect such as a contour, profile, texture, relief, grains, pattern, variation, thickness, depth, etc.; the effect may comprise an illumination effect such as an image, icon, display, pattern, shadowing, etc. The base layer of the cover may be formed on the substrate. The cover layer of the cover may be formed on the base layer of the cover. A coating may be formed on the cover layer of the cover. The coating may provide the exterior surface on the cover layer of the cover. The cover layer may be configured to present the surface effect of the cover. The cover layer may be configured to present the visual effect of the cover. A coating may provide the exterior surface on the cover layer of the cover and the cover layer may be configured to present the surface effect through the coating of the cover. The coating may provide the exterior surface on the cover layer of the cover and the cover layer may be configured to present the surface effect comprising a texture through the coating of the cover. The coating may provide the exterior surface on the cover layer of the cover and the cover layer may be configured to present the visual effect through the coating of the cover.

According to an exemplary embodiment as shown schematically in FIGS. 3G-3L, 15A-15J, 16C-16E, 18A-18B, 20B, 24A-24D and 25A-25C, the cover layer of the cover may comprise a set of light-transmissive sections such as voids (e.g. providing passage for light transmission, functioning as light guides, etc.). The light-transmissive sections of the cover layer may be configured to provide the illumination effect of the cover. The light-transmissive sections may comprise voids in the cover layer. The light-transmissive sections may comprise holes in the cover layer. The light-transmissive sections may comprise openings in the cover layer. The cover layer may be at least partially light transmissive. The base layer of the cover may be at least partially light transmissive. The base layer of the cover may comprise a light-transmissive material. The base layer of the cover may comprise a set of light transmissive sections. The light-transmissive sections of the base layer may be configured to provide the illumination effect of the cover. The light-transmissive sections of the cover layer may align with the light-transmissive sections of the base layer. The light-transmissive sections of the cover layer and the light-transmissive sections of the base layer may be configured to present the illumination effect of the cover. The voids for light transmission may be partially or fully filled with a light-transmissive material (e.g. to form a light guide). Light may be provided by a light source such as a module and/or from light elements such as LED lamps and transmitted through the substrate and through light-transmissive sections of the cover (e.g. voids, light guides, light-transmissive material, etc.) to present an effect such as an illuminated effect at the surface of the cover. See FIGS. 3G-3L, 15A-15J, 16C-16E, 18A-18B, 19A-19D, 20A-20B, 21A-21B, 24A-24D and 25A-25C.

According to an exemplary embodiment as shown schematically in FIGS. 3C-3F, 3I-3L, 5A-5C, 6A-6C, 7A-7C, 10A-10E, 11A-11C, 12A-12C, 13A-13D, 14A-14I, 23B and 23F, the cover may comprise the base layer and the cover layer and a coating. The coating may comprise a light-transmissive coating. The visual effect of the cover may comprise a pattern of the cover layer of the cover. The surface effect of the cover may comprise a pattern of the base layer of the cover. The base layer of the cover may comprise a deposited material formed on the substrate. The deposited material of the base layer of the cover may comprise a resin. The deposited material of the base layer of the cover may comprise a form on the substrate. The cover layer may comprise a coating on the form of the base layer on the substrate. The form may be configured to present the surface effect. The cover layer may comprise a coating. The cover layer may comprise an ink. The cover layer may comprise a formed material on the substrate. The cover layer may comprise a formed material on the base layer of the cover. The formed material may comprise a color. The color may comprise at least one of (a) black and/or (b) yellow and/or (c) magenta and/or (d) cyan. The color may comprise at least one of (a) black and/or (b) yellow and/or (c) magenta and/or (d) cyan and/or (e) white and/or (f) metallic color. The cover layer may comprise an ink applied on the base layer of the cover. The substrate may comprise a material; the material of the substrate may comprise of at least one of resin, plastic, plastic resin, thermoplastic resin, thermoset resin, metal, alloy, aluminum, natural fiber, wood, bamboo. The base layer may comprise a material; the material of the base layer may comprise at least one of plastic, resin, polyurethane resin, polyacrylic resin, polymethacrylic resin, polyepoxide resin, pigments, solvents, dyes, flakes, monomers, additives, fillers, photoinitiators. The cover layer may comprise a material; the material of the cover layer may comprise at least one of plastic, ink, resin, polyurethane resin, polyacrylic resin, polymethacrylic resin, polyepoxide resin, pigments, solvents, dyes, flakes, monomers, additives, fillers, photoinitiators. The cover may comprise a coating; the coating may comprise at least one of plastic, resin, optically clear material, coating, film layer. The component may comprise a coating formed on the cover layer. The coating may comprise a clear coating. The coating may comprise the exterior surface of the cover.

According to an exemplary embodiment as shown schematically in FIGS. 3G-3L, 15A-15J, 16C-16E, 18A-18B, 20B, 24A-24D and 25A-25C, the cover layer may comprise a set of holes; a coating may be applied on the cover layer and in the set of holes of the cover layer. The cover layer may be configured to present the illumination effect of the cover through a set of holes in the cover layer; a coating may provide the exterior surface on the cover layer of the cover and the cover layer may be configured to present the surface effect through the coating of the cover. The visual effect of the cover may comprise the illumination effect through the set of holes in the cover layer and the surface effect through a coating on the cover layer of the cover. The surface effect on the exterior surface of the cover may be presented by a pattern on the cover layer of the cover. The pattern may comprise a wood grain effect. The pattern may comprise a color effect. The pattern may comprise a relief. The pattern may comprise a relief; the relief may comprise at least one of contour, profile, texture, haptic surface, sculptural design, plastic formation. The pattern may comprise a texture. The pattern may comprise a profile. The pattern may comprise a printed pattern. The surface effect on the exterior surface of the cover may be presented by a form on the base layer. The form on the base layer may comprise a profile. The surface effect on the exterior surface of the cover may be presented by a form on the base layer of the cover and a pattern on the cover layer of the cover.

According to an exemplary embodiment as shown schematically in FIGS. 4A-4B, 5A-5C, 6A-6C, 7A-7C, 9A-9D, 10A-10E, 11A-11C, 12A-12C, 13A-13D, 14A-14I, 22A-22C, 26A-26B and 27A-27C, the component may be formed by a process comprising the steps of applying the base layer to the substrate then applying the cover layer to the substrate. The cover layer may be applied on the base layer. The process may comprise the step of securing the substrate in a fixture. The substrate may be rotated in the fixture so that the cover layer can be applied. The component may be formed by a process comprising the steps of applying the base layer to the substrate then applying the cover layer over the substrate then applying the coating over the substrate.

According to an exemplary embodiment as shown schematically, the coating may comprise a functional coating. The coating may comprise a protective coating in the cover. The coating may comprise a finish for the exterior surface of the cover. The coating may comprise at least one of a (a) gloss finish; (b) matte finish; (c) surface texture; (d) surface finish; (e) smooth finish; (f) rough finish; (g) protective layer; (h) chemical-resistive layer; (i) scratch-resistant layer; (j) sun-light exposure protective layer; (k) corrosion resistant layer. The visual effect of the cover may comprise a multi-color effect. The multi-color effect may comprise a grain pattern. The multi-color effect may comprise a grain pattern with a texture. The visual effect may comprise a grain pattern with texture providing the surface effect; the surface effect may comprise a texture effect; the texture effect may comprise a smooth texture over the grain pattern. See FIGS. 28A-28E, 29A-29B, 30 and 31.

According to an exemplary embodiment as shown schematically in FIGS. 15A-15J and 17, the component may comprise a module comprising the light source. The component may be configured to present a user interface at the exterior surface of the cover; the user interface may comprise the visual effect. The component may comprise a module comprising the light source configured to present the user interface. The user interface may comprise the illumination effect; the illumination effect may comprise an illuminated image. The illuminated image may comprise a set of icons.

According to an exemplary embodiment as shown schematically in FIGS. 4A-4B, 5A-5C, 6A-6C, 7A-7C, 9A-9D, 10A-10E, 11A-11C, 12A-12C, 13A-13D, 14A-14I, 22A-22C, 26A-26B and 27A-27C, a method of producing a component for a vehicle interior configured to be illuminated by light from a light source may comprise the steps of providing a substrate and forming a cover on the substrate to provide an exterior surface. The substrate may be at least partially light-transmissive. The cover may be at least partially light-transmissive. The cover may be configured to present an effect comprising a visual effect and/or a surface effect on the exterior surface. The visual effect may comprise an illumination effect when illuminated by light from the light source. The cover may comprise a base layer and a cover layer configured to present the surface effect. The base layer of the cover may be formed on the substrate. The cover layer of the cover may be formed on the base layer of the cover. A coating may be formed on the cover layer of the cover. The coating may provide the exterior surface on the cover layer of the cover. The cover layer may be configured to present the surface effect of the cover. The step of forming the cover on the substrate may comprise the step of applying a base layer on the substrate. The step of forming the cover on the substrate may comprise the step of applying a cover layer on the substrate. The step of forming the cover on the substrate may comprise the step of applying a coating on the substrate. The step of forming the cover on the substrate may comprise the step of applying a base layer on the substrate then applying a cover layer on the base layer. The step of forming the cover on the substrate may comprise the step of applying a coating on the base layer. The step of forming the cover on the substrate may comprise the step of applying a base layer on the substrate then applying a cover layer with voids on the base layer. According to an exemplary embodiment as shown schematically, the step of forming the cover on the substrate may comprise the step of applying a base layer with voids on the substrate then applying a cover layer with voids on the base layer. The voids of the base layer and voids of the cover layer may be configured to provide the illumination effect of the cover. The method may comprise the step of curing material of the cover using at least one of ultraviolet (UV) light, UV-A light, UV-B light, UV-C light, light in a wave length created by UV-LED, light in a wave length created by UV-Mercury lamp, by hot air; in an oven; by infrared (IR) radiation; by near infrared (NIR) radiation.

According to an exemplary embodiment as shown schematically in FIGS. 1B, 2B, 3G-3L, 15A-15J, 16C-16E, 18A-18B, 19A-19D, 20A-20B, 21A-21B, 24A-24D and 25A-25C, a component for a vehicle interior configured to be illuminated by light from a light source may comprise a substrate and a cover comprising a cover layer formed on the substrate and comprising an exterior surface. The substrate may be at least partially light-transmissive. The cover may be at least partially light-transmissive. The cover may be configured to present an effect comprising a visual effect and/or a surface effect on the exterior surface. The visual effect may comprise an illumination effect when illuminated by light from the light source. The cover may be at least partially opaque. The cover may comprise a base layer; the base layer of the cover may comprise an opaque material formed on the substrate. The cover layer of the cover may comprise an opaque material formed on the base layer of the cover. A coating may be formed on the cover layer of the cover. The coating may provide the exterior surface on the cover layer of the cover. The cover layer may be configured to present the surface effect of the cover. A coating may provide the exterior surface on the cover layer of the cover and the cover layer may be configured to present the surface effect through the coating of the cover. The cover layer of the cover may comprise a set of light-transmissive sections. The cover may comprise an opaque mask layer and a set of light-transmissive sections. The cover layer of the cover may comprise a set of light-transmissive sections comprising at least one of a void and/or a light-transmissive filling.

According to an exemplary embodiment as shown schematically in FIGS. 4A-4B, 5A-5C, 6A-6C, 7A-7C, 8 and 22A-22C, the component may be formed with an apparatus; the apparatus may comprise at least one of a print bar, an ink jet printer, a three-dimensional printer, an additive manufacturing apparatus, a pad printer, a screen printer. The component may be formed with an apparatus comprising a print bar; the print bar may be configured to deposit the base layer and the cover layer. The print bar may be configured to deposit a coating. The print bar may be configured to deposit at least one of ink, paint, clear coating, color coating, plastic material.

According to an exemplary embodiment as shown schematically, a component for a vehicle interior configured to be illuminated by light from a light source may comprise a substrate and a cover comprising a cover layer formed on the substrate and comprising an exterior surface. The substrate may be at least partially light-transmissive. The cover may be at least partially light-transmissive. The cover may be configured to present an effect comprising a visual effect and/or a surface effect on the exterior surface. The visual effect may comprise an illumination effect when illuminated by light from the light source. The cover may be at least partially opaque. The cover may comprise a base layer; the base layer of the cover may comprise an opaque material formed on the substrate. The cover layer of the cover may comprise an opaque material formed on the base layer of the cover. According to an exemplary embodiment as shown schematically, a coating may be formed on the cover layer of the cover. The coating may provide the exterior surface on the cover layer of the cover. The cover layer may be configured to present the surface effect of the cover. A coating may provide the exterior surface on the cover layer of the cover and the cover layer may be configured to present the surface effect through the coating of the cover. According to an exemplary embodiment as shown schematically, the cover layer of the cover may comprise a set of light-transmissive sections. The cover may comprise an opaque mask layer and a set of light-transmissive sections. The cover layer of the cover may comprise a set of light-transmissive sections comprising at least one of a void and/or a light-transmissive filling.

According to an exemplary embodiment as shown schematically in FIGS. 4A-4B, 5A-5C, 6A-6C, 7A-7C, 8 and 22A-22C, the component may be formed with an apparatus; the apparatus may comprise at least one of a print bar, an ink jet printing head, an ink jet printer, a continuous ink jet printer, a drop on demand ink jet printer, a three-dimensional printer, an additive manufacturing apparatus, a pad printer, a screen printer. The component may be formed with an apparatus comprising a print bar; the print bar may be configured to deposit the base layer and the cover layer. The print bar may be configured to deposit a coating. The print bar may be configured to deposit at least one of ink, paint, clear coating, color coating, plastic material. According to an exemplary embodiment as shown schematically, a vehicle interior configured to be decorated by deposit of material by an apparatus may comprise a substrate and a cover formed on the substrate and comprising an exterior surface. The substrate may be at least partially decorated. The cover may be at least partially decorated. The cover may be configured to present an effect comprising a visual effect and/or a surface effect on the exterior surface. The visual effect may comprise a decorative effect produced by the material on the substrate. The cover may comprise a base layer and a cover layer configured to present the effect. The apparatus may comprise a printer. Deposit of material may comprise printing. The apparatus may comprise a digital printer and the deposit of material may comprise digital printing. The apparatus may comprise at least one of a printer such as an ink jet printer, a continuous ink jet printer, a drop on demand ink jet printer, a pad printer, a screen printer, a three-dimensional printer, an additive manufacturing apparatus, etc. As indicated schematically, the apparatus may comprise an ink jet printing head. The ink jet printing head may comprise a print bar; the print bar may be configured to deposit the materials for the base layer and the cover layer. The printing head may be configured with the substrate in a fixture; the substrate and/or printing head and maybe rotated so that the base layer, the cover layer and/or the exterior layer can be applied on and around the substrate. See FIGS. 4A-4B, 5A-5C, 6A-6C, 7A-7C, 8 and 22A-22C.

According to an exemplary embodiment, the component may be configured to be produced by process in which the cover is formed on a substrate; the component may be configured to be produced by process in which the cover is formed on a substrate by an additive manufacturing apparatus (e.g. configured to deposit material); the cover may comprise a base layer to provide a structure and a cover layer to provide an effect that may comprise a visual effect and/or a surface effect.

According to an exemplary embodiment, an improved vehicle interior component may configured to be produced by process in which the cover is formed on a substrate by an apparatus so that the cover may comprise a base layer to provide a structure and a cover layer to provide an effect that may comprise a visual effect such as a pattern and/or decorative effect and/or illumination effect and/or a surface effect such as a profile/relief and/or texture.

| REFERENCE SYMBOL LIST | |
|---|---|
| ELEMENT, PART OR COMPONENT | REFERENCE SYMBOL |
| Vehicle | V |
| Interior | I |
| Vehicle interior component | C |
| Panel | PN |
| Door panel | DP |
| Floor Console | FC |
| Instrument Panel | IP |
| Substrate/base | SB |
| Cover (composite | TC |
| Base layer (cover) | TB |
| Cover Exterior/Decorative layer (cover) | TX |
| Protective/coating layer (cover) | TR |
| Mask layer | ML |
| Effect (cover) | EF |
| (surface effect, decorative effect, illumination effect, visual effect, etc.) | |
| Pattern (cover) | PT |
| Relief/Profile (cover) | PR |
| Opening/Void/Hole (cover) | OP |
| Light source | LS |
| LED/light elements | LED |
| Light | L |
| Module (electronics/light source/sensor, etc.) | M |
| User Interface | UI |
| Image | IM |
| Apparatus/tool | AP |
| Print bar | PB |
| Fixture | FX |
| Deposited material (e.g. resin, plastic, etc.) for TB | B |
| Deposited material (e.g. color, ink, etc.) for TX (black/K, yellow/Y, magenta/M, cyan/C) | X |
| Deposited material (e.g. coating, clear coat, optical coating, etc.) for TR | R |

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A component for a vehicle interior configured to be illuminated by light from a light source comprising:
   (a) a substrate; and
   (b) a cover formed on the substrate and comprising an exterior surface;
   wherein the substrate is at least partially light-transmissive;
   wherein the cover is at least partially light-transmissive;
   wherein the cover is configured to present an effect comprising a visual effect and/or a surface effect on the exterior surface;
   wherein the visual effect comprises an illumination effect when illuminated by light from the light source;
   wherein the cover comprises a base layer and a cover layer configured to present the effect;
   wherein the effect of the cover comprises a relief;
   wherein the relief comprises a profile configured to present the effect on the exterior surface of the cover.

2. The component of claim 1 wherein a coating provides the exterior surface on the cover layer of the cover and the cover layer is configured to present the surface effect through the coating.

3. The component of claim 2 wherein the cover layer is configured to present the surface effect comprising a texture through the coating.

4. The component of claim 2 wherein the cover layer is configured to present the visual effect through the coating.

5. The component of claim 1 wherein the cover layer comprises a set of light-transmissive sections configured to provide the illumination effect.

6. The component of claim 1 wherein the cover layer comprises a set of light-transmissive sections comprising at least one of voids; holes; and/or openings in the cover layer.

7. The component of claim 6 wherein the base layer comprises a set of light transmissive sections; wherein the light-transmissive sections of the cover layer and the light-transmissive sections of the base layer are configured to present the illumination effect of the cover.

8. The component of claim 1 wherein the surface effect of the cover comprises a pattern of the base layer.

9. The component of claim 1 wherein the base layer comprises a deposited material formed on the substrate.

10. The component of claim 9 wherein the deposited material of the base layer comprises at least one of (a) a resin; and/or (b) a form on the substrate.

11. The component of claim 1 wherein the cover layer comprises a coating on a form on the base layer on the substrate.

12. The component of claim 1 wherein the surface effect on the exterior surface of the cover is presented by a form on the base layer.

13. The component of claim 1 wherein the surface effect on the exterior surface of the cover is presented by a form on the base layer and a pattern on the cover layer; wherein the form comprises the profile and/or the pattern comprises the profile.

14. A component for a vehicle interior configured to be illuminated by light from a light source comprising:
   (a) a substrate; and
   (b) a cover comprising a cover layer formed on the substrate and comprising an exterior surface;
   wherein the substrate is at least partially light-transmissive;
   wherein the cover is at least partially light-transmissive;
   wherein the cover is configured to present an effect comprising a visual effect and/or a surface effect on the exterior surface;
   wherein the visual effect comprises an illumination effect when illuminated by light from the light source;
   wherein the cover is at least partially opaque;
   wherein the cover comprises a pattern;
   wherein the pattern comprises a profile;
   wherein the profile comprises a relief configured to present the effect of the cover.

15. The component of claim 14 formed with an apparatus configured to deposit at least one of (a) a base layer formed on the substrate; (b) the cover layer; and/or (c) a coating.

16. The component of claim 15 wherein the apparatus is configured to deposit at least one of ink; paint; clear coating; color coating; material by additive manufacture, material by three-dimensional (3D) printing and/or plastic material.

17. The component of claim 14 wherein a coating provides the exterior surface on the cover layer; wherein the coating comprises a matte finish.

18. The component of claim 14 wherein the profile is configured to present the surface effect.

19. The component of claim 14 wherein the surface effect comprises the pattern; wherein the pattern comprises at least one of the relief and/or a wood grain effect.

20. The component of claim 14 wherein the relief comprises at least one of contour, texture, haptic surface, sculptural design, plastic formation.

* * * * *